US008040343B2

(12) United States Patent
Kikuchi et al.

(10) Patent No.: US 8,040,343 B2
(45) Date of Patent: Oct. 18, 2011

(54) MAP DISPLAY DEVICE AND MAP DISPLAY METHOD

(75) Inventors: Shin Kikuchi, Tokyo (JP); Hiroshi Sakamoto, Tokyo (JP)

(73) Assignee: Navitime Japan Co., Ltd., Tokyo (JP)

( * ) Notice: Subject to any disclaimer, the term of this patent is extended or adjusted under 35 U.S.C. 154(b) by 1018 days.

(21) Appl. No.: 11/817,746

(22) PCT Filed: Mar. 2, 2005

(86) PCT No.: PCT/JP2005/003471
§ 371 (c)(1),
(2), (4) Date: Sep. 4, 2007

(87) PCT Pub. No.: WO2006/092853
PCT Pub. Date: Sep. 8, 2006

(65) Prior Publication Data
US 2009/0046093 A1    Feb. 19, 2009

(51) Int. Cl.
*G06T 15/00*    (2011.01)
(52) U.S. Cl. .................. 345/419; 345/418; 345/420
(58) Field of Classification Search ............... None
See application file for complete search history.

(56) References Cited

U.S. PATENT DOCUMENTS

| | | | |
|---|---|---|---|
| 5,467,444 A * | 11/1995 | Kawamura et al. | 345/441 |
| 5,555,354 A * | 9/1996 | Strasnick et al. | 345/427 |
| 5,727,138 A | 3/1998 | Harada | |
| 6,201,544 B1 | 3/2001 | Ezaki | |
| 6,452,544 B1 * | 9/2002 | Hakala et al. | 342/357.31 |
| 6,628,278 B1 * | 9/2003 | Ritter | 345/419 |

FOREIGN PATENT DOCUMENTS

| | | |
|---|---|---|
| JP | 03-252874 A | 11/1991 |
| JP | 08-83353 A | 3/1996 |
| JP | 9-134122 A | 5/1997 |
| JP | 0897170 A2 | 2/1999 |
| JP | 11-65428 A | 3/1999 |

(Continued)

OTHER PUBLICATIONS

International Search Report of PCT/JP2005/003471, date of mailing May 31, 2005.

(Continued)

*Primary Examiner* — Said Broome
(74) *Attorney, Agent, or Firm* — Westerman, Hattori, Daniels & Adrian, LLP

(57) ABSTRACT

A map display device and a map display method, in which a building in a map is formed as a pseudo three-dimensional figure and arithmetic processing to display the figure as a bird's-eye view is simplified. The map display device 20 for displaying map data, formed from vector data, on a display means has a plane figure-for-bird's-eye-view creation means 218, a shift amount storage means 219, a building position determination means 220, and a figure data copying means 221. The plane-figure-for-bird's-eye-view creation means 218 creates, from the map data formed from vector data, a plane figure for creating a bird's-eye view. The figure data copying means 221 copies and draws the plane figure to display a bird's-eye view. This is performed based on the positions of buildings determined by the building determination means 220 and on the shift amounts stored in the shift amount storage means 219, and in this process, the plane figures are shifted upward on a display screen according to the shift amounts, and the copying and drawing are made one by one from a building positioned on the far side in the bird's-eye view.

2 Claims, 21 Drawing Sheets

FOREIGN PATENT DOCUMENTS

| | | |
|---|---|---|
| JP | 2001-27534 A | 1/2001 |
| JP | 2002-72869 A | 3/2002 |
| JP | 2002-341753 A | 11/2002 |
| JP | 2003-263102 A | 9/2003 |
| JP | 2003-344089 A | 12/2003 |
| JP | 2004-294615 A | 10/2004 |

OTHER PUBLICATIONS

Translation of the International Preliminary Report on Patentability of International Application No. PCT/JP2005/003471, with Form PCT/IB/373 and Form PCT/ISA/237.

Notification of Transmittal of Translation of the Int'l Preliminary Report on Patentability, with Form PCT/IB/373 and Form PCT/ISA/237.

European Search Report dated Jul. 22, 2010, issued in corresponding European Application No. 05719786.

"Painter's algorithm" Wikipedia' Jan. 12, 2005, pp. 1-2, XP002590577; Retrieved from internet: URL:http://en.wikipedia.org/w/index.php?title=Painter%27s_algorithm&oldid=12012807[retrieved on Jun. 25, 2010].

* cited by examiner

|    |          | BUILDING DATA            |              | ATTRIBUTE INFORMATION |                          |               |
|----|----------|--------------------------|--------------|-----------------------|--------------------------|---------------|
| No | BUILDING | POSITION                 | PLANAR SHAPE | BUILDING NAME         | HEIGHT (NUMBER OF FLOORS)| DISPLAY COLOR |
| 1  | A        | LATITUDE*/LONGITUDE*     | VECTOR DATA  | TEXT                  | *m (10 FLOORS)           | WHITE         |
| 2  | B        |                          |              |                       |                          |               |
| 3  | C        |                          |              |                       |                          |               |
| 4  | D        |                          |              |                       |                          |               |
| 5  | E        |                          |              |                       |                          |               |
| 6  | F        |                          |              |                       |                          |               |
|    |          |                          |              |                       |                          |               |
|    |          |                          |              |                       |                          |               |
| n  | Z        |                          |              |                       |                          |               |

Fig. 2

MAP DISPLAY DEVICE AND MAP DISPLAY METHOD

TECHNICAL FIELD

The present invention relates to a map display device and a map display method used in a navigation system or the like, and particularly relates to a map display device and a map display method in which buildings on a map are rendered as three-dimensional shapes similar to the buildings, and arithmetic processing for displaying a bird's-eye view is simplified.

BACKGROUND ART

Car-mounted navigation devices have been provided in the past for guiding the driver of an automobile along the optimum route from a departure point to a destination point. A conventional navigation device has a CD-ROM, IC card, or other map data storage device in which map data are recorded; a display device; and a gyroscope, a GPS (Global Positioning System), a speed sensor, and other vehicle movement detection devices and the like for detecting the current position and the current bearing of the vehicle. Map data that include the current position of the vehicle are read from the map data storage device, a map image of the vicinity of the vehicle's position is created on the display device on the basis of the map data, and by superimposing a vehicle position marker (location) on the display screen, scrolling the map image according to the movement of the vehicle, or keeping the map image fixed on the screen while moving the vehicle position marker, the location in which the vehicle is currently traveling can be instantly recognized.

Such a vehicle-mounted navigation device is usually equipped with a route guidance function to ensure that the driver can easily travel to the desired destination point without mistaking the route. In this route guidance function, the map data are used to calculate a simulation by the Dijkstra method or the like and search for the lowest-cost route that links the departure point to the destination point, the searched route is stored in advance as a guidance route, and the guidance route is displayed on the map image in bold and in a different color than the other roads. When the vehicle approaches within a certain distance from an intersection at which the course on the guidance route is to be changed, an arrow indicating the course is displayed at the intersection at which there is to be a course change on the map image, whereby the driver can easily recognize the optimum route to the destination point.

The vehicle-mounted navigation device described above is a standalone navigation device that has map data or a route search function, but such a navigation device must be provided with all the functions necessary for navigation, which increases the size and cost of the device. Recent developments in communication and information processing techniques have led to the widespread use of so-called communication-type navigation systems in which functionality for communicating via a network is added to the vehicle-mounted navigation device to enable data communication with a route search server and to acquire guidance route data or map data. A system in which a mobile telephone is used as a navigation terminal has also been implemented as a pedestrian navigation system.

The map data used for route searching in a pedestrian navigation system or a car navigation system are referred to as road network data. When the road network is composed of roads A, B, and C as shown in FIG. 20, for example, the end points, intersection points, turning points, and other points of roads A, B, and C are designated as nodes; roads linking the nodes are indicated by directional links; and the road network data are composed of node data (node latitude/longitude), link data (link numbers), and link costs (distance between links or time required to travel to a link) in the form of link cost data. Specifically, in FIG. 20, the symbols — and ◉ indicate nodes, wherein the ◉ indicates an intersection of roads. Directional links between nodes are indicated by arrow lines (solid lines, dashed lines, chain double-dashed lines). Links in the upstream and downstream directions of the roads are present, but only links in the direction of the arrows are shown in FIG. 20 to simplify the diagram.

When the data of such a road network is route-searched as a database for route searching, a link connected from the node of the departure point to the node of the destination point is traced, the link cost is stored, and the route having the smallest stored link cost is searched and used for guidance. Specifically, in cases in which a route search is performed using node AX in FIG. 20 as the departure point and node CY as the destination point, sequential tracing and accumulation of the link cost are performed for the link to node CY in which road A is traveled from node AX and a right turn into road C is made at the second intersection point, and the route having the smallest cumulative value for the link cost is searched and used for guidance. Other routes from node AX to node CY are not shown in FIG. 20. However, other routes actually exist, and routes whereby it is possible to reach node CY from node AX are therefore searched in the same manner, and the route having the smallest link cost among the searched routes is determined to be the optimum route. This technique is in accordance with the publicly known technique known as the Dijkstra method.

The road network data in the vehicle-mounted navigation system are composed only of roads that can be traveled by automobile, and there is no need for pedestrian road network data on pedestrian-only roads or roads inside parks or in front of train stations where vehicle entry is prohibited. In a navigation system for pedestrians, data for road networks that can be traveled by automobile are included in addition to the above-described pedestrian road network data for pedestrian-only roads or roads inside parks or in front of train stations where vehicle entry is prohibited, but there is no need for network data for highways and other roads on which walking is prohibited.

In a navigation system in which a mobile telephone is used as a navigation terminal, since there are also situations in which a user places the mobile telephone inside an automobile and uses the mobile telephone in the same manner as a car navigation system, the route search server is provided with road network data for performing automobile route searches as well as pedestrian road network data for performing pedestrian route searches, and the appropriate road network data are used for the route search according to the transportation mode (walking or riding) specified by the user as a condition for the route search. In the pedestrian navigation system, since it is often the case that transportation facilities are also used by the pedestrian, the route search server is furthermore provided with network data for lines in a transportation facility and running time data for trains, commuter trains, buses, and the like that move on each line, and the route search is performed using line network data and running time data when a transportation facility is specified as the transportation mode.

In such a navigation system, the guidance route is displayed on the map in the navigation terminal, and important buildings and other structures on the map are displayed to make the current position or the direction of travel easier to recognize. The route search server therefore stores a database of map data for display that include building data in addition to the road network data used for route searching. Such road network data or map data are composed of unit data (mesh data) that are divided into prescribed sizes by latitude and longitude, and the route search server transmits the optimum guidance route data obtained as a result of the route search to the navigation terminal, and transmits map data that include the current position, i.e., eight units of mesh data that surround mesh data at the center that include the current position, to the navigation terminal on the basis of current position information (latitude and longitude) received from the navigation terminal.

When the guidance route data and the map data are received from the route search server, the navigation terminal temporarily stores these data in a storage means, and presents the guidance route, a current position marker indicating the current position of the navigation terminal, and a prescribed range of the map that includes the current position, to VRAM and displays these items in the display means. When the current position changes and the map data are inadequate, the navigation terminal requests map data from the route search server and receives a transmission of the needed map data. The road network data or the map data are accumulated in the database in the form of vector data, and the navigation terminal can perform prescribed computation of the data as needed to enlarge or rotate the map or the guidance route.

The method for transmitting a map and displaying the map in a terminal device in this manner is not limited to a navigation system for performing route searching and route guidance, and is used in the same manner in a map display system for transmitting a current position or desired position information and receiving a transmission of map data. Attempts have been made to realistically convey the layout of the vicinity to the user in the form of an image that approximates the actual landscape by displaying the map as a bird's-eye view in which important buildings on the map are indicated as three-dimensional representations when a navigation terminal or other terminal device displays a map.

For example, a map display device is disclosed in Patent Reference 1 (Japanese Laid-open Patent Application No. 2001-27534) in which even the shapes of building walls are drawn and displayed in three dimensions. The map display device disclosed in Patent Reference 1 is aimed at making it easier to identify structures and recognize the correspondence to the actual landscape in a map display device that is used as a vehicle navigation device, and is configured so as to display a set window frame shape and wall surface color according to the type of building displayed in three dimensions. The number of window frames in the display is the same as the number of floors of the building, and the roof surface of the building at the destination point is colored dark red. Specifically, this map display device is a map display device for displaying roads, structures, and the like in three dimensions in a display means on the basis of map data that are stored in a map data storage means, wherein the structures are displayed in the display means along with modifications according to characteristics of the structures.

In order to create a display such as the one described above, the map data storage device in the map display device disclosed in Patent Reference 1 is composed of a DVD-ROM, a hard disk, a CD-ROM, or other high-capacity storage medium, and a playback device for retrieving the data stored in the storage medium. A three-dimensional digital (road) map database that includes road map data and data and the like for creating a three-dimensional display of various types of structures and the like (government administration offices, banks, schools, station buildings, airports, hotels, buildings, various types of facilities, and other structures) is recorded in the storage medium. Text information for displaying the names of intersections, cities, towns, villages, and the like is also recorded in the storage medium. The data for creating a three-dimensional display of structures in the road map data are composed of position data and polygon data and other data that denote the planar shape of buildings, height (number of floors) data, and other characteristics. Type data that indicate the type of structure, and text information for displaying the names of structures are recorded in the storage medium.

Patent Reference 2 (Japanese Laid-open Patent Application No. 9-134122) discloses a vehicle map display device for displaying a representation of the height direction of a bird's-eye view for land that is at or above a prescribed height in the map display, rather than a building display. The vehicle map display device disclosed in Patent Reference 2 displays a realistic bird's-eye view through simple processing. Specifically, this vehicle map display device reads the range of road map data to be displayed from the map storage memory, detects the elevation information included in the read road map data, determines whether points on the road map are at an elevation equal to or higher than a reference elevation h (meters), and sets the elevation of regions lower than the reference elevation of h meters to zero meters. Only the map region that has an elevation equal to or higher than the reference elevation of h meters is thereby displayed three-dimensionally when the bird's-eye view is displayed, and map regions that are lower than the reference elevation of h meters are displayed at a constant elevation. The map display is therefore easier to read, and the draw speed of the map is enhanced.

In general, when buildings on the map are displayed as three-dimensional representations in a bird's-eye view such as the one shown in FIG. 21, there is a need to process portions that are observed from behind buildings; i.e., so-called hidden surface removal processing is needed to remove the image data of portions of the rear buildings 23 or 25 that are blocked by the images of the front buildings 22 or 24. For example, Patent Reference 3 (Japanese Laid-open Patent Application No. 2003-263102) discloses a map display device in which hidden surface removal processing is performed by a method referred to as a Z buffer method.

The map display device disclosed in Patent Reference 3 creates a three-dimensional map in which structural elements of the map are arranged on the basis of a map storage means. Affine transformation, perspective conversion processing, and other prescribed processing of the three-dimensional map are then performed, after which hidden surface removal processing by a Z buffer method or other method is performed to create a projection drawing obtained when the abovementioned three-dimensional map is viewed from a certain perspective. Information relating to the map components displayed in the projection drawing is then read from an information storage means, after which a display region in the projection drawing of the map components displayed in the projection drawing is detected. The detected display region is then used as a basis for setting a display region of the related information on the projection drawing. The display region of the related information on the projection drawing is set for each map component having related information that is displayed in the projection drawing, and is also set each time there is a change in the displayed region of the map component on the projection drawing.

[Patent Reference 1]: Japanese Laid-open Patent Application No. 2001-27534 (FIGS. 1 and 6, and paragraphs [0015] and [0037] through [0045])

[Patent Reference 2]: Japanese Laid-open Patent Application No. 9-134122 (FIGS. 1 and 2, and paragraphs [0007] and [0013] through [0019])

[Patent Reference 3]: Japanese Laid-open Patent Application No. 2003-263102 (FIG. 29, and paragraphs [0030] through [0034], [0054], and [0055])

DISCLOSURE OF THE INVENTION

Problems the Invention is Intended to Solve

When a bird's-eye view is displayed that includes three-dimensional representations of buildings on a map such as the one described above, not only is there a need for arithmetic processing for affine transformation of vector data that indicate the shapes of building included in the map data, and computing a three-dimensional image based on the building height data, but the aforementioned hidden surface removal processing must be performed to process the portions of buildings that overlap each other, as in the devices disclosed in Patent Reference 1 or 3 above. This arithmetic processing is performed by the CPU of the navigation terminal or other terminal device and provided to the VRAM, and is displayed by a liquid crystal display unit or other display means. The arithmetic processing ability of the computer (CPU) that constitutes the navigation terminal or other terminal device therefore becomes an issue.

Particularly in a pedestrian navigation or map display device that uses a mobile telephone as a terminal device, the drawing speed becomes a problem due to limited CPU processing ability and inadequate display processing ability when displaying a three-dimensional bird's-eye view such as the one created in Patent Reference 1 or 3.

Since the display overlap for a single building and a plurality of buildings must be determined in order to display the buildings, the amount of calculation becomes extremely large. Since rules of perspective are also applied in drawing windows and other textures on walls, an affine transformation must be performed for each wall surface, and the arithmetic processing is not easily performed by the CPU of a mobile telephone.

Particularly in a mobile navigation system used by a pedestrian, a function is provided for rotating the display screen to the correct bearing according to the orientation of the mobile telephone through the use of a magnetic direction sensor or the like, and the display orientation changes in a dizzying manner according to the angle at which the pedestrian holds the mobile telephone. The mobile telephone is usually grasped in a lowered hand, and at such times as when the screen is held in front of the face for viewing, the map takes time to rotate, and drawbacks occur in that it takes time for the display to be oriented in the correct direction. The capability and power consumption of the CPU are too limited for this processing to be performed at high speed by the hardware of the mobile telephone, and merely enhancing the processing capability of the CPU to overcome this problem is not necessarily a preferred measure.

As a result of concentrated investigation aimed at overcoming the problems described above, the inventors developed the present invention upon discovering that buildings can be displayed in a birds-eye view as three-dimensional representations through simple calculation by performing affine transformation, for example, of plane figures of the buildings in sequence beginning with a building that is positioned farthest away in a bird's-eye view to create plane figures used for the bird's-eye view, and duplicating and drawing the plane figures for the bird's-eye view while shifting the plane figures for the bird's-eye view by a prescribed amount in the upward direction of the screen according to the height or number of floors that is recorded in attribute information of the building data.

Specifically, an object of the present invention for overcoming the abovementioned drawbacks is to provide a map display device and a map display method whereby buildings on a map are displayed as three-dimensional representations, and the arithmetic processing performed to display a bird's-eye view is simplified.

Means for Solving the Abovementioned Problems

The invention according to a first aspect for overcoming the abovementioned problems is characterized in comprising a map display device having a map display device for displaying map data that are composed of vector data in a display means, wherein the map display device comprises means for creating a plane figure for a bird's-eye view, shift amount storage means, building position determination means, and figure data duplication means;

the means for creating a plane figure for a bird's-eye view creates a bird's-eye-view plane figure for creating a bird's-eye view from the map data composed of vector data; and the figure data duplication means duplicates and draws a bird's-eye-view plane figure while shifting the plane figures of buildings upward on a screen in sequence from the building positioned farthest away in the bird's-eye view according to the shift amount on the basis of a building position determined by the building position determination means and on the basis of a shift amount stored by the shift amount storage means.

The invention according to a second aspect is the invention according to the first aspect, and is characterized in that the map data composed of vector data include building data to which height information relating to a height of a building is added, and a bird's-eye-view plane figure is duplicated and drawn a number of times that is in accordance with the height information while being shifted upward on a screen by the shift amount.

The invention according to a third aspect is the invention according to the second aspect, and is characterized in that a number of times that is in accordance with the height information is uniformly determined without regard for the height of each building, and the bird's-eye-view plane figure is duplicated and drawn a number of times that is equal to the number of times while being shifted upward on a screen according to the shift amount.

The invention according to a fourth aspect is the invention according to the second aspect, and is characterized in that the buildings are divided into a plurality of groups having different heights on the basis of the height information; a number of times in accordance with the height information is determined for each group; and the bird's-eye-view plane figure is duplicated and drawn the number of times determined for each of the groups while being shifted upward on a screen according to a shift amount.

The invention according to a fifth aspect is the invention according to the first aspect, and is characterized in that a shift amount stored by the shift amount storage means has a plurality of values according to a display region of the display means, and a value of the amount of upward shift in the display region is set so as to be smaller than an amount of downward shift in the display screen.

The invention according to a sixth aspect is characterized in comprising a map display device having a map display device for displaying map data that are composed of vector data in a display means, wherein the map display device comprises means for creating a plane figure for a bird's-eye view, shift amount storage means, building position determination means, and figure data duplication means;

the means for creating a plane figure for a birds-eye view creates bird's-eye-view plane figures of buildings in sequence from the building positioned farthest away in a bird's-eye view on the basis of a building position determined by the building position determination means, and draws a first layer of plane data; and the figure data duplication means duplicates and draws the first layer of plane data while shifting the first layer of plane data upward on a screen according to the shift amount on the basis of the shift amount stored by the shift amount storage means, and displays the bird's-eye view.

The invention according to a seventh aspect is the invention according to the sixth aspect, and is characterized in that the map data composed of vector data include building data to which height information relating to a height of a building is added, and a bird's-eye-view plane figure is duplicated and drawn a number of times that is in accordance with the height information while being shifted upward on a screen by the shift amount.

The invention according to an eighth aspect is the invention according to the seventh aspect, and is characterized in that a number of times that is in accordance with the height information is uniformly determined without regard for the height of each building, and the bird's-eye-view plane figure is duplicated and drawn a number of times that is equal to the number of times while being shifted upward on a screen according to the shift amount.

The invention according to a ninth aspect is the invention according to the seventh aspect, and is characterized in that the buildings are divided into a plurality of groups having different heights on the basis of the height information; a number of times in accordance with the height information is determined for each group; bird's-eye-view plane figures of buildings that have portions at a common height among buildings in a bird's-eye view are grouped; and the grouped aerial plane figures are duplicated and drawn while the grouped bird's-eye-view plane figures are shifted in sequence from a lower layer the determined number of times upward on a screen according to a shift amount.

The invention according to a tenth aspect is the invention according to the sixth aspect, and is characterized in that a shift amount stored by the shift amount storage means has a plurality of values according to a display region of the display means, and a value of the amount of upward shift in the display region is set so as to be smaller than an amount of downward shift in the display screen.

The invention according to an eleventh aspect is the invention according to any of the first through tenth aspects, and is characterized in that the map data composed of vector data include building data to which attribute information relating to a color of a building is added, and a bird's-eye-view plane figure that corresponds to an uppermost layer of buildings among the duplicated and drawn bird's-eye-view plane figures is color-coded based on the attribute information.

The invention according to a twelfth aspect is characterized in comprising a map display method in a map display device having a map display device for displaying map data that are composed of vector data in a display means, wherein the map display device comprises means for creating a plane figure for a bird's-eye view, shift amount storage means, building position determination means, and figure data duplication means; and the map display method comprises:

a step in which the means for creating a plane figure for a bird's-eye view creates a birds-eye-view plane figure for creating a bird's-eye view from the map data composed of vector data;

a step in which the figure data duplication means duplicates and draws a bird's-eye-view plane figure while shifting the plane figures of buildings upward on a screen in sequence from the building positioned farthest away in the bird's-eye view according to the shift amount on the basis of a building position determined by the building position determination means and on the basis of a shift amount stored by the shift amount storage means; and a step in which the bird's-eye view is displayed.

The invention according to a thirteenth aspect is the invention according to the twelfth aspect, and is characterized in comprising a step in which the map data composed of vector data include building data to which height information relating to a height of a building is added, and a birds-eye-view plane figure is duplicated and drawn a number of times that is in accordance with the height information while being shifted upward on a screen by the shift amount.

The invention according to a fourteenth aspect is the invention according to the thirteenth aspect, and is characterized in comprising a step in which a number of times that is in accordance with the height information is uniformly determined without regard for the height of each building, and the bird's-eye-view plane figure is duplicated and drawn a number of times that is equal to the number of times while being shifted upward on a screen according to the shift amount.

The invention according to a fifteenth aspect is the invention according to the thirteenth aspect, and is characterized in comprising a step in which the buildings are divided into a plurality of groups having different heights on the basis of the height information, a number of times in accordance with the height information is determined for each group, and the bird's-eye-view plane figure is duplicated and drawn the number of times determined for each of the groups while being shifted upward on a screen according to a shift amount.

The invention according to a sixteenth aspect is the invention according to the twelfth aspect, and is characterized in comprising a step in which a shift amount stored by the shift amount storage means has a plurality of values according to a display region of the display means, a value of the amount of upward shift in the display region is set so as to be smaller than an amount of downward shift in the display screen, and the bird's-eye-view plane figure is duplicated and drawn while being shifted according to the shift amount.

The invention according to a seventeenth aspect is characterized in comprising a map display method in a map display device having a map display device for displaying map data that are composed of vector data in a display means, wherein the map display device comprises means for creating a plane figure for a bird's-eye view, shift amount storage means, building position determination means, and figure data duplication means; and the map display method comprises:

a step in which the means for creating a plane figure for a birds-eye view creates bird's-eye-view plane figures of buildings in sequence from the building positioned farthest away in a bird's-eye view on the basis of a building position determined by the building position determination means, and draws a first layer of plane data; and a step in which the figure data duplication means duplicates and draws the first layer of plane data while shifting the first layer of plane data upward on a screen according to the shift amount on the basis of the shift amount stored by the shift amount storage means; and a step in which the bird's-eye view is displayed.

The invention according to an eighteenth aspect is the invention according to the seventeenth aspect, and is characterized in comprising a step in which the map data composed of vector data include building data to which height information relating to a height of a building is added, and a bird's-eye-view plane figure is duplicated and drawn a number of times that is in accordance with the height information while being shifted upward on a screen by the shift amount.

The invention according to a nineteenth aspect is the invention according to the eighteenth aspect, and is characterized in comprising a step in which a number of times that is in accordance with the height information is uniformly determined without regard for the height of each building, and the birds-eye-view plane figure is duplicated and drawn a number of times that is equal to the number of times while being shifted upward on a screen according to the shift amount.

The invention according to a twentieth aspect is the invention according to the eighteenth aspect, and is characterized in comprising a step in which the buildings are divided into a plurality of groups having different heights on the basis of the height information, a number of times in accordance with the height information is determined for each group, bird's-eye-view plane figures of buildings that have portions at a common height among buildings in a birds-eye view are grouped, and the grouped aerial plane figures are duplicated and drawn while the grouped bird's-eye-view plane figures are shifted in sequence from a lower layer the determined number of times upward on a screen according to a shift amount.

The invention according to a twenty-first aspect is the invention according to the seventeenth aspect, and is characterized in comprising a step in which a shift amount stored by the shift amount storage means has a plurality of values according to a display region of the display means, a value of the amount of upward shift in the display region is set so as to be smaller than an amount of downward shift in the display screen, and the bird's-eye-view plane figure is duplicated and drawn while being shifted according to the shift amount.

The invention according to a twenty-second aspect is the invention according to any of the twelfth through twenty-first aspects, and is characterized in comprising a step in which the map data composed of vector data include building data to which attribute information relating to a color of a building is added, and a bird's-eye-view plane figure that corresponds to an uppermost (*1) layer of buildings among the duplicated and drawn bird's-eye-view plane figures is color-coded based on the attribute information.

Effect of the invention

In the invention according to the first through fourth aspects, the map display device is provided with means for creating a plane figure for a bird's-eye view, shift amount storage means, building position determination means, and map data duplication means, wherein the means for creating a plane figure for a bird's-eye view creates a bird's-eye-view plane figure for creating a bird's-eye view from the map data composed of vector data, and the figure data duplication means duplicates and draws a bird's-eye-view plane figure while shifting the plane figures of buildings upward on a screen in sequence from the building positioned farthest away in the bird's-eye view according to the shift amount on the basis of a building position determined by the building position determination means and on the basis of a shift amount stored by the shift amount storage means.

Accordingly, a bird's-eye view can be displayed merely by subjecting the vector data of the buildings to an affine transformation in sequence from the building positioned farthest in the bird's-eye view to create plane figures (polygons), duplicating and drawing the plane figures a number of times that is in accordance with the height of the building while shifting the plane figures a prescribed shift amount upward on the screen. Since the affine transformation as such is a simple calculation, and the plane figure is simply duplicated thereafter, a building can be drawn as a three-dimensional representation by an extremely simple computational process in comparison to the processing for computing a three-dimensional image of a building. A bird's-eye view can therefore be easily displayed even when the CPU of the map display device has limited processing capability.

In the invention according to the fifth aspect, the shift amount stored by the shift amount storage means in the invention according to the first aspect has a plurality of values according to the display region of the display means, and the value of the amount of upward shift in the display region is set so as to be smaller than the amount of downward shift in the display screen. Accordingly, buildings at the top (farther away in the bird's-eye view) of the screen can be displayed small, and buildings at the bottom (closer in the bird's-eye view) of the screen can be displayed large to display an appropriate three-dimensional figure.

In the invention according to the sixth through ninth aspects, the map display device comprises means for creating a plane figure for a bird's-eye view, shift amount storage means, building position determination means, and figure data duplication means; the means for creating a plane figure for a bird's-eye view creates bird's-eye-view plane figures of buildings in sequence from the building positioned farthest away in a bird's-eye view on the basis of a building position determined by the building position determination means, and draws a first layer of plane data; and the figure data duplication means duplicates and draws the first layer of plane data while shifting the first layer of plane data upward on a screen according to the shift amount on the basis of the shift amount stored by the shift amount storage means, and displays the bird's-eye view.

Accordingly, since the vector data of the buildings are subjected to an affine transformation in sequence from the building positioned farthest in the bird's-eye view to create plane figures (polygons), a first layer of plane data are drawn, and the first-layer layer plane figure is merely duplicated thereafter, a building can be drawn as a three-dimensional representation by an extremely simple computational process in comparison to the processing for computing a three-dimensional image of a building. A bird's-eye view can therefore be easily displayed even when the CPU of the map display device has limited processing capability.

In the invention according to the tenth aspect, the shift amount stored by the shift amount storage means in the invention according to the sixth aspect has a plurality of values according to the display region of the display means, and the value of the amount of upward shift in the display region is set so as to be smaller than the amount of downward shift in the display screen. Accordingly, buildings at the top (farther away in the bird's-eye view) of the screen can be displayed small, and buildings at the bottom (closer in the birds-eye view) of the screen can be displayed large to display an appropriate three-dimensional figure.

In the invention according to the eleventh aspect, the map data composed of vector data include building data to which attribute information relating to a color of a building is added in the invention according to any of the first through tenth aspects, and a bird's-eye-view plane figure that corresponds to an uppermost layer of buildings among the duplicated and drawn bird's-eye-view plane figures is color-coded based on the attribute information. The map display device can therefore display the buildings in a more easily recognizable manner.

In the map display method according to the twelfth through fifteenth aspects, the means for creating a plane figure for a bird's-eye view creates a birds-eye-view plane figure for creating a bird's-eye view from the map data composed of vector data, and the figure data duplication means duplicates and draws a bird's-eye-view plane figure while shifting the plane figures of buildings upward on a screen in sequence from the building positioned farthest away in the bird's-eye view according to the shift amount on the basis of a building position determined by the building position determination means and on the basis of a shift amount stored by the shift amount storage means.

Accordingly, a bird's-eye view can be displayed merely by subjecting the vector data of the buildings to an affine transformation in sequence from the building positioned farthest in the bird's-eye view to create plane figures (polygons), duplicating and drawing the plane figures a number of times that is in accordance with the height of the building while shifting the plane figures a prescribed shift amount upward on the screen. Since the affine transformation as such is a simple calculation, and the plane figure is simply duplicated thereafter, a building can be drawn as a three-dimensional representation by an extremely simple computational process in comparison to the processing for computing a three-dimensional image of a building. A birds-eye view can therefore be easily displayed even when the CPU of the map display device has limited processing capability.

In the invention according to the sixteenth aspect, the shift amount stored by the shift amount storage means in the invention according to the twelfth aspect has a plurality of values according to the display region of the display means, and the value of the amount of upward shift in the display region is set so as to be smaller than the amount of downward shift in the display screen. Accordingly, buildings at the top (farther away in the bird's-eye view) of the screen can be displayed small, and buildings at the bottom (closer in the bird's-eye view) of the screen can be displayed large to display an appropriate three-dimensional figure.

In the map display method according to the seventeenth through twentieth aspects, the means for creating a plane figure for a bird's-eye view creates bird's-eye-view plane figures of buildings in sequence from the building positioned farthest away in a bird's-eye view on the basis of a building position determined by the building position determination means, and draws a first layer of plane data; and the figure data duplication means duplicates and draws the first layer of plane data while shifting the first layer of plane data upward on a screen according to the shift amount on the basis of the shift amount stored by the shift amount storage means.

Accordingly, since the vector data of the buildings are subjected to an affine transformation in sequence from the building positioned farthest in the bird's-eye view to create plane figures (polygons), a first layer of plane data are drawn, and the first-layer plane figure is merely duplicated thereafter, a building can be drawn as a three-dimensional representation by an extremely simple computational process in comparison to the processing for computing a three-dimensional image of a building. A bird's-eye view can therefore be easily displayed even when the CPU of the map display device has limited processing capability.

In the invention according to the twenty-first aspect, the shift amount stored by the amount storage means in the invention according to the seventeenth aspect has a plurality of values according to the display region of the display means, and the value of the amount of upward shift in the display region is set so as to be smaller than the amount of downward shift in the display screen. Accordingly, buildings at the top (farther away in the bird's-eye view) of the screen can be displayed small, and buildings at the bottom (closer in the bird's-eye view) of the screen can be displayed large to display an appropriate three-dimensional figure.

In the invention according to the twenty-second aspect, the map data composed of vector data include building data to which attribute information relating to a color of a building is added in the invention according to any of the twelfth through twenty-first aspects, and a bird's-eye-view plane figure that corresponds to an uppermost layer of buildings among the duplicated and drawn bird's-eye-view plane figures is color-coded based on the attribute information. The map display device can therefore display the buildings in a more easily recognizable manner.

BRIEF DESCRIPTION OF THE DRAWINGS

FIG. 2 is a diagram showing the structure of the building data included in the map data;

KEY TO SYMBOLS

Figure 1:
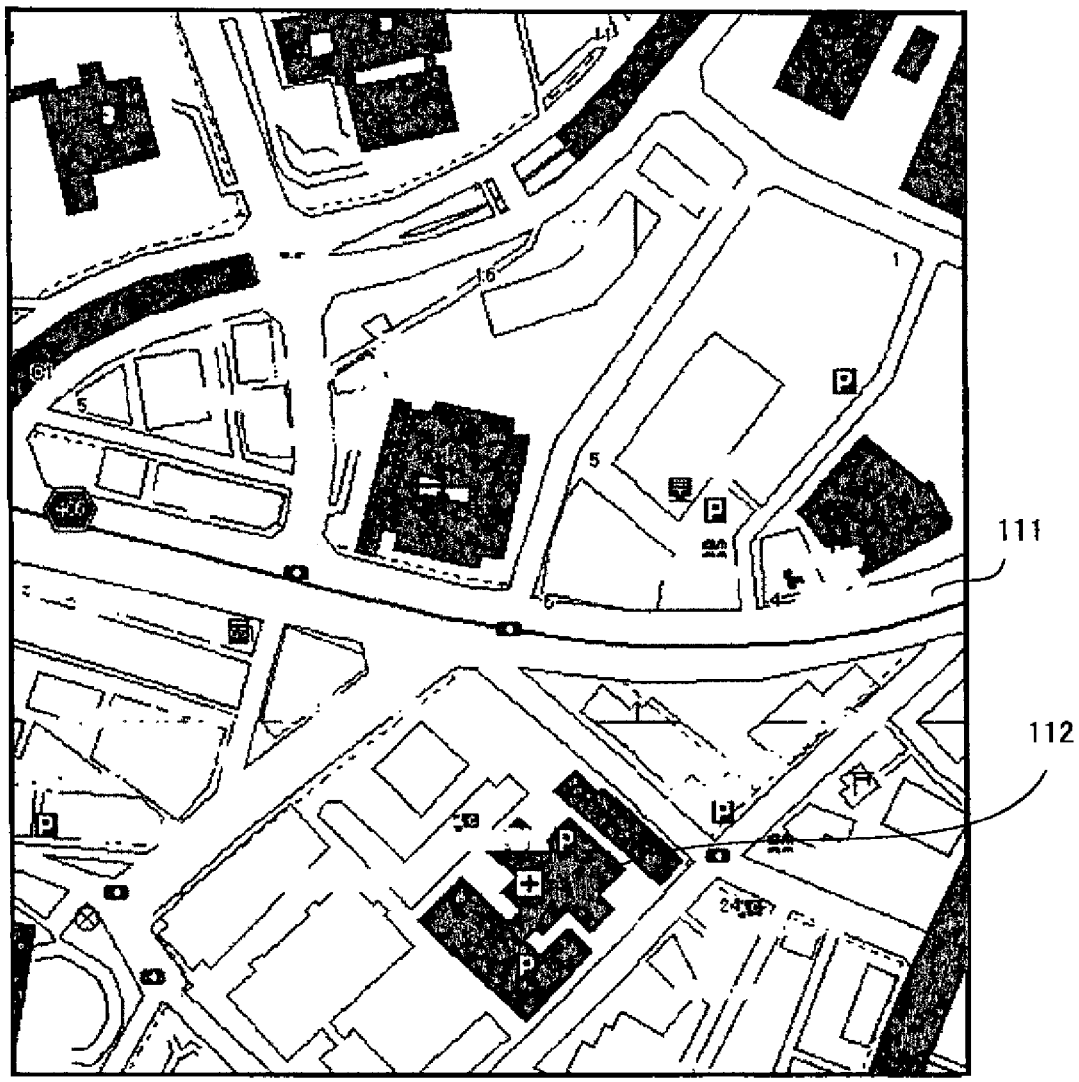
FIG. 1 is a diagram showing an example of the map that is displayed by the map display system provided with the map display device according to an example of the present invention.

10 map display system
11 network
20 map display device
211 control means (CPU)
212 communication means
213 data storage means
214 VRAM
215 display means
216 operation/input means
217 data request means
218 means for creating a plane figure for a bird's-eye view
219 shift amount storage means
220 building position determination means
221 map data duplication means
30 route search server
311 control means (CPU)
312 communication means
313 route guiding means
314 transmission data creation means
315 route search means
316 road network data (DB)
317 map data (DB)

BEST MODE FOR CARRYING OUT THE INVENTION

Specific examples of the present invention will be described in detail hereinafter using working examples and drawings. The examples of the present invention described hereinafter are of a navigation system that is provided with a route search server as an information transmission server having route search and guidance capability, and a map display device that uses a mobile telephone or the like as a navigation terminal that is connected to the route search server via the Internet or another network. However, the present invention is not limited by this example, and the present invention may also be a standalone map display device or a device that can also be used as an information terminal device having navigation capability. In the example of a navigation system for pedestrian use, it is useful to show the heights of buildings in a bird's-eye view, because buildings that serve as landmarks for guidance are more recognizably displayed. However, since a pedestrian travels on the ground and is not moving according to visual information such as a bird's-eye view, there is no need to pursue a more realistic shape for the buildings than is necessary in the bird's-eye view, and a drawing that quickly responds to changes in movement or bearing is preferred.

Figure 3:
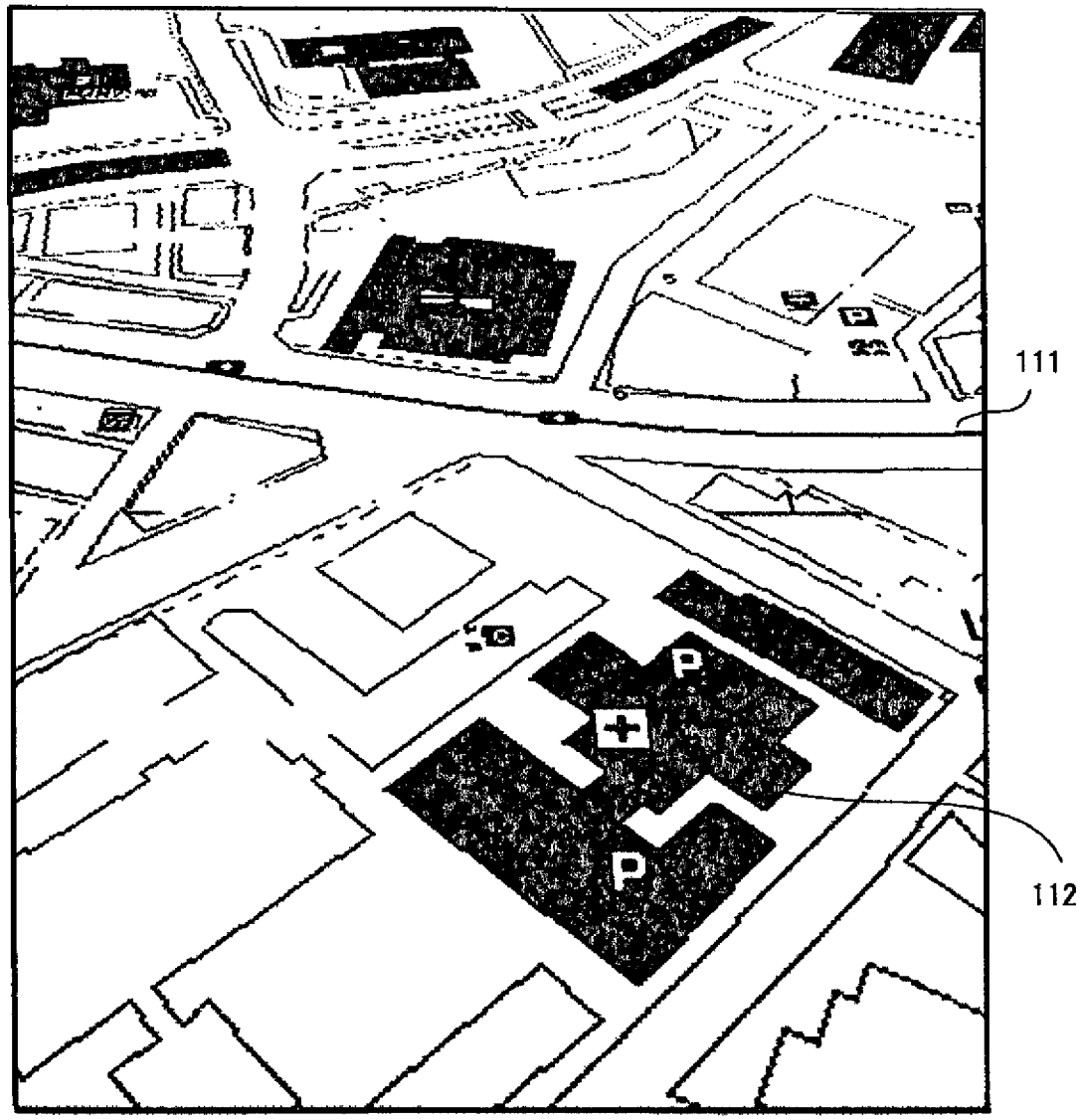
FIG. 3 is a diagram showing the display screen in the case of a display for a bird's-eye view created by conversion from data that indicate plane figures of buildings.
Figure 4:
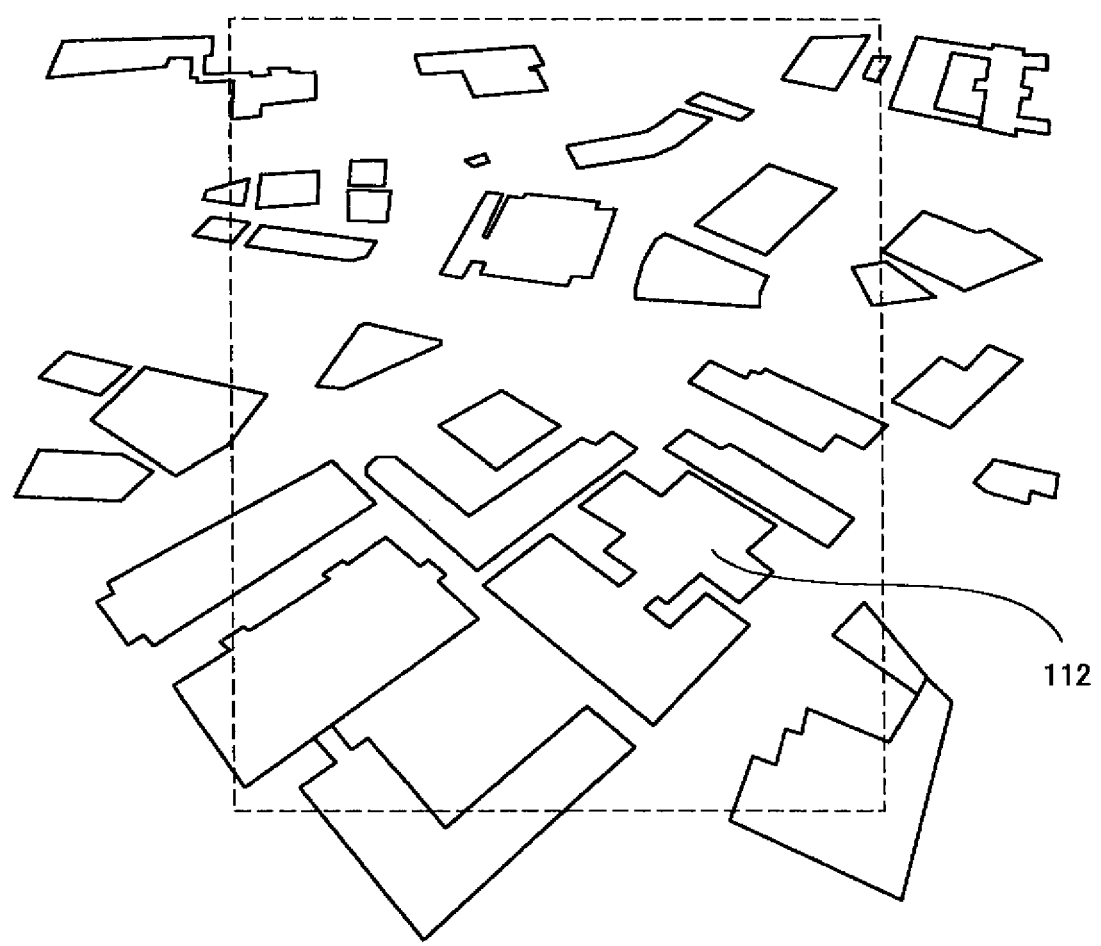
FIG. 4 is a diagram showing a plane figure for a bird's-eye view of a building converted in the manner shown in FIG. 3.
Figure 5:
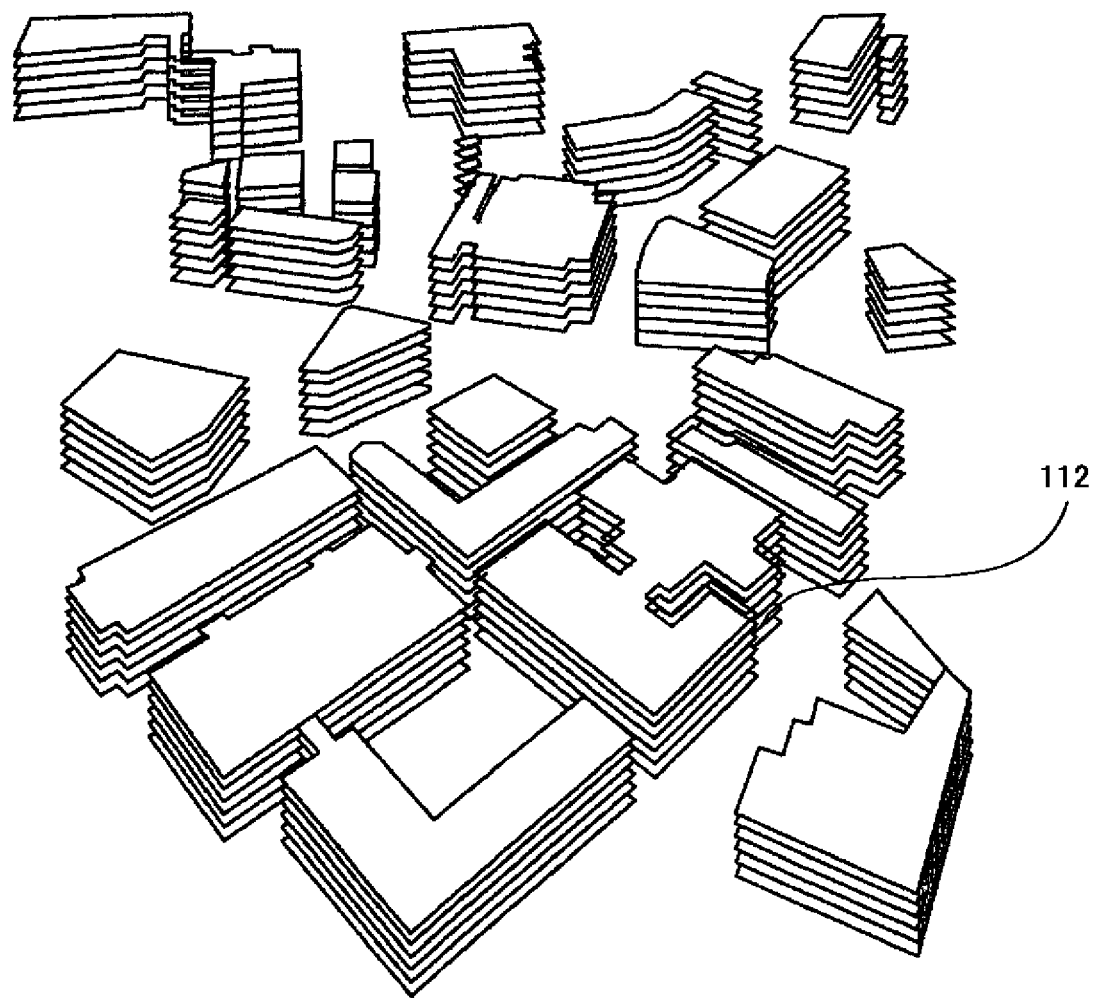
FIG. 5 is a schematic diagram illustrating the concept of the display method according to Example 1 of the present invention, in which the plane figure shown in FIG. 4 is used to create a three-dimensional bird's-eye view of buildings.
Figure 6:
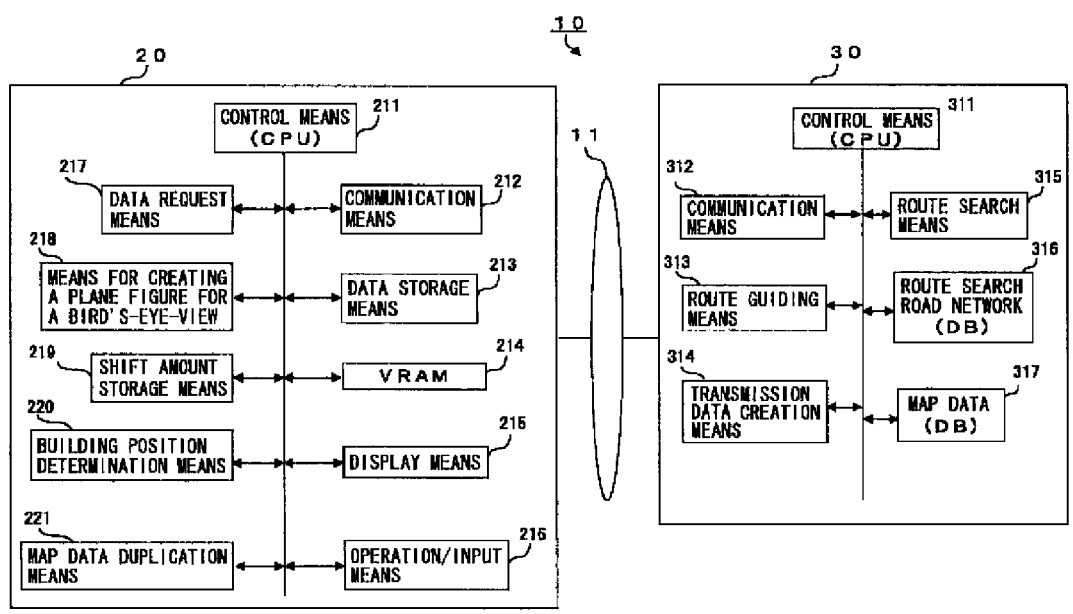
FIG. 6 is a block diagram showing the structure of the map display system provided with the map display device according to Example 1 of the present invention.
Figure 7:
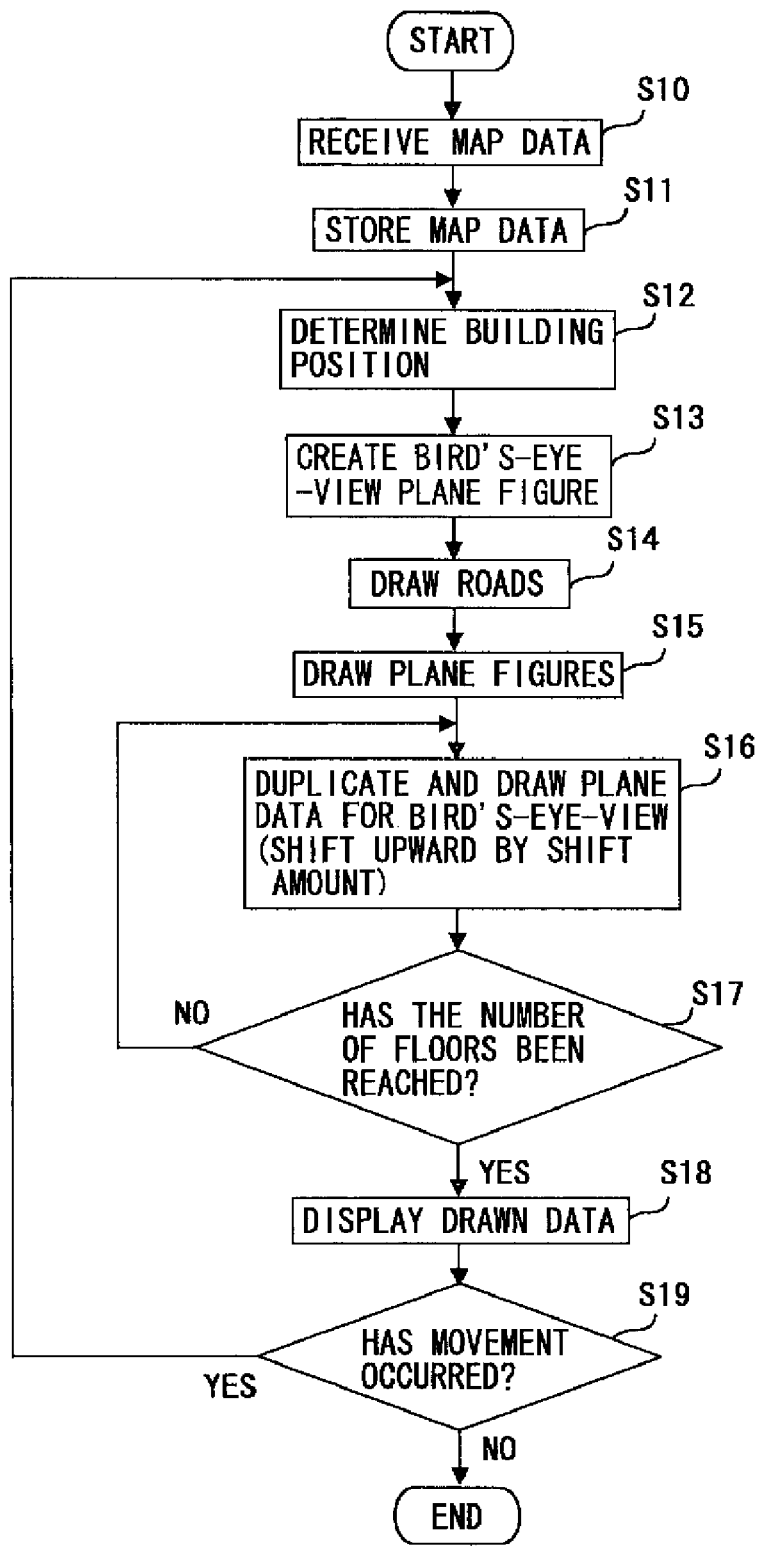
FIG. 7 is a flowchart showing the sequence of routines for creating image data for displaying the bird's-eye view according to Example 1 of the present invention.

FIG. 1 is a diagram showing an example of the map that is displayed by the map display system provided with the map display device according to an example of the present invention. FIG. 2 is a diagram showing the structure of the building data included in the map data. FIG. 3 is a diagram showing the display screen in the case of a display for a bird's-eye view created by conversion from data that indicate plane figures of buildings. FIG. 4 is a diagram showing a plane figure for a bird's-eye view of a building converted in the manner shown in FIG. 3. FIG. 5 is a schematic diagram illustrating the concept of the display method according to Example 1 of the present invention, in which the plane figure shown in FIG. 4 is used to create a three-dimensional bird's-eye view of buildings. FIG. 6 is a block diagram showing the structure of the map display system provided with the map display device according to Example 1 of the present invention. FIG. 7 is a flowchart showing the sequence of routines for creating image data for displaying the bird's-eye view according to Example 1 of the present invention Example 1

The map displayed in the display means of the map display device according to Example 1 of the present invention is displayed by presenting a plan view of vector map data that are received from a route search server by a navigation application for performing a route search, as shown in FIG. 1. FIG. 1 is monochrome, but lots or buildings are indicated by polygons and color-coded by a color that is determined by the attributes of the lot or building. Specifically, a road 111 is drawn in the displayed map as shown in FIG. 1, and the outline of the lot or building of the building 112 is drawn in the corresponding position on the map. As previously mentioned, the map data are thus accumulated as a map data DB (database) in the route search server as map data that are separate from the data of the road network used for route searching, and the map data are transmitted according to a request from the navigation terminal device, or are transmitted to the navigation terminal device along with guidance route data as the results of the route search.

The building data included in the map data are structured as shown in FIG. 2. Vector data indicating the position (latitude and longitude) and the planar shape of the building are accumulated as building data, and attribute information indicating attributes of the data of each building, e.g., the name of the building (text data), the height or number of floors of the building, the display color of the building, and other attributes are also accumulated. When such map data are received, and a bird's-eye view is created in which the buildings included in the map are shown as three-dimensional representations in the navigation terminal device, a sequence of affine transformations, for example, starting with the building positioned farthest away in the bird's-eye view is performed for plane figures of the buildings to create plane figures (polygons). The affine transformation computation can easily be performed by converting the vector data (see FIG. 2) of the plane figure of a building into trapezoidal data. The method of this conversion is disclosed in Patent Reference 3, for example.

A map that has a sense of depth such as the one shown in FIG. 3 can be created by subjecting the building or lot vector data to an affine transformation as previously described, and drawing the vector data. At this time, the polygons of the lots or buildings are affine transformed, and the insides thereof can be color-coded in a color that is determined by the attributes of the lot or building. FIG. 3 is a diagram showing the display screen when bird's-eye-view plane figures created in this manner are displayed. Specifically, as shown in FIG. 3, the shapes of the road 111 and the building 112 are based on the perspective of the bird's-eye view, and shapes of distant roads or buildings are affine transformed and converted to trapezoidal shapes for drawing by the display means. The planar shapes of buildings converted in this manner are as shown in FIG. 4. In FIG. 4, the region enclosed by the dashed lines is the portion that appears on the display screen in FIG. 3.

When a three-dimensional representation of buildings is created by the conventional method in such a bird's-eye view, a large amount of wall surface data from the plane figures must be affine transformed, and the amount of calculation is extremely large. Hidden surface removal processing using a Z buffer method is also necessary, which is also extremely burdensome (a large amount of arithmetic processing time is required) for the computing device. Therefore, a characteristic feature of the map display device according to Example 1 of the present invention is that bird's-eye-view plane figures shown in FIG. 4 that are created through affine transformation of plane figures of the buildings are duplicated and drawn while the bird's-eye-view plane figures are shifted upward on the screen as shown in FIG. 5 by a prescribed shift amount that is in accordance with the height or number of floors recorded in the attribute information of the building data. Specifically, as shown in FIG. 5, a method is employed whereby a number of copies of the plane figures equal to the number of floors are drawn upward on the screen on the basis of the height information of the buildings, e.g., data added as building attribute information that indicate the height or number of floors. This method makes it possible to easily draw the buildings as three-dimensional representations without arithmetic processing that requires complex or time-consuming calculations.

The aforementioned drawing can be performed by copying the plane figures and stacking a prescribed number of the plane figures upward on the screen, and three-dimensional representations of buildings can be created without calculating wall surfaces or resorting to a Z buffer method. Specifically, the method of Example 1 eliminates the need for computation of three-dimensional shapes from the planar shape data and height data of the buildings, and the need for computation for hidden surface removal.

FIG. 5 shows an example in which six layers of plane figures are copied and drawn for all of the buildings regardless of differences in the number of floors between buildings, in order to simplify processing. As previously mentioned, in the case of a navigation system for pedestrian use, since a pedestrian travels on the ground and is not moving according to visual information such as a bird's-eye view, there is no need to pursue a more realistic shape for the buildings than is necessary in the bird's-eye view, and there is no need for a display in which buildings are distinguished by the actual number of floors. It is instead preferred that the buildings be displayed in classifications of tall, medium, and short, and that the drawing quickly respond to changes in movement or bearing.

FIG. 6 is a block diagram showing the structure of the map display system 10 provided with the map display device 20 according to Example 1. As shown in FIG. 6, the map display system 10 is provided with a route search server 30, and a map display device 20 that communicates via the Internet or another network 11. The map display device 20 functions as a navigation terminal device and transmits a departure point, a destination point, and other route search conditions set in a route search request to the route search server 30, and the route search server 30 references the road network data according to the route search conditions to search for the optimum route, compiles the optimum route into guidance route data, and transmits the guidance route data along with map data to the map display device 20. The route search server 30 also transmits requested map data as information to the map display device 20 according to a request from the map display device 20.

Figure 20:
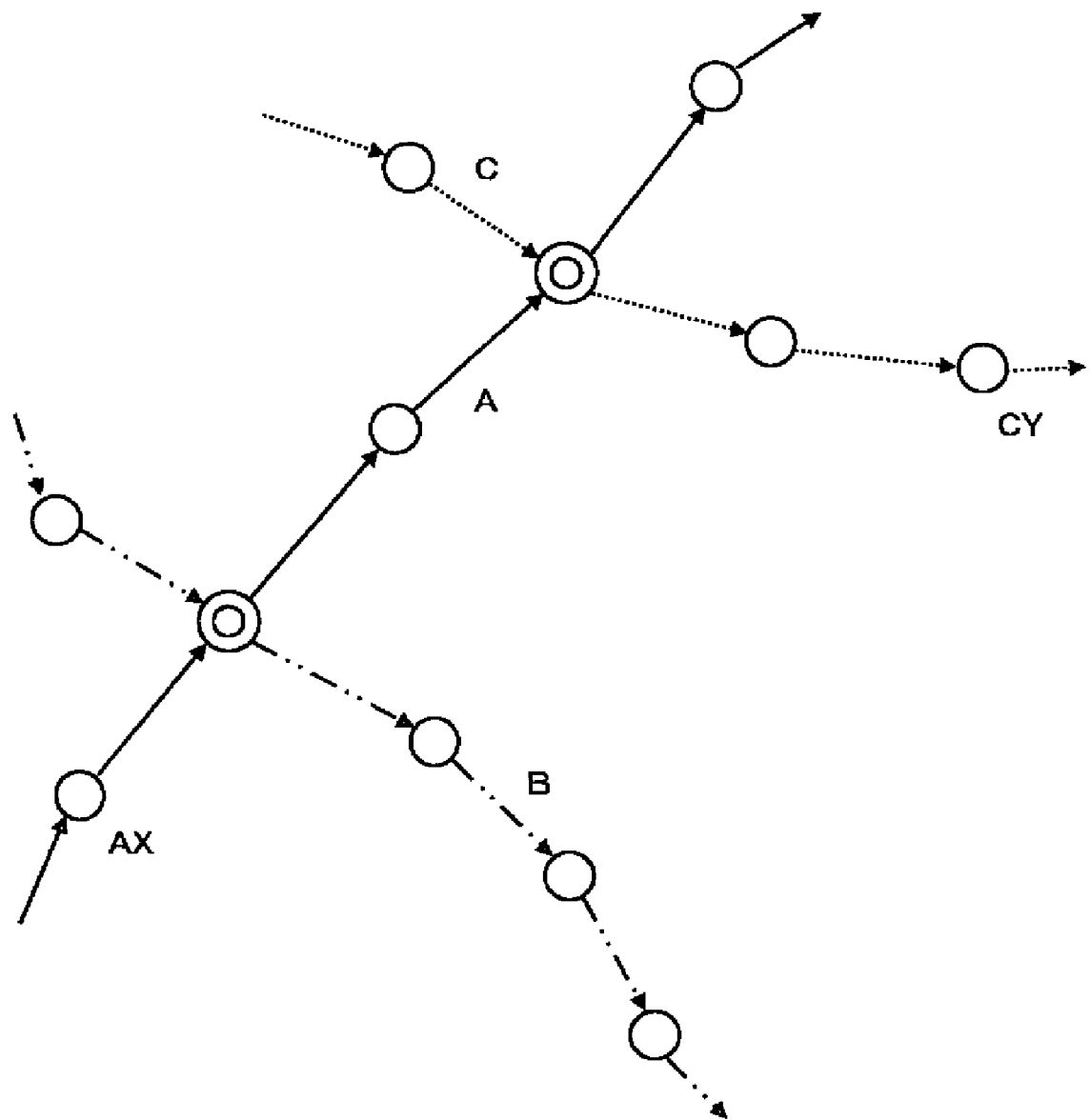
FIG. 20 is a schematic diagram showing the road network for performing a common route search.
Figure 21:
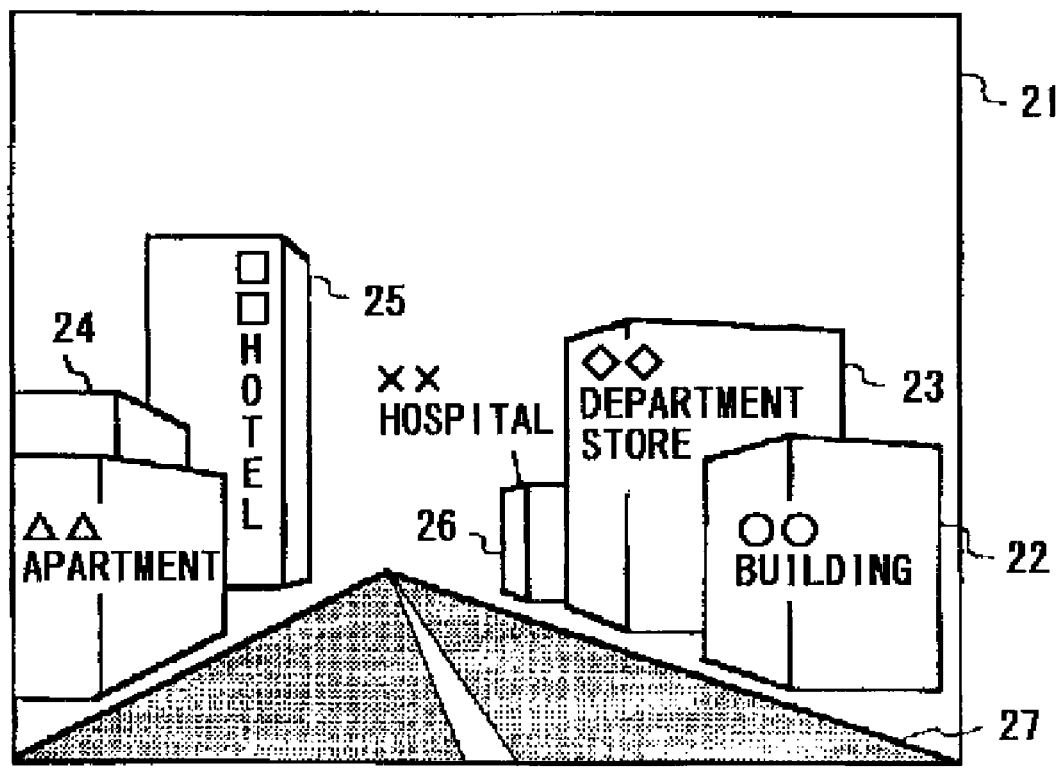
FIG. 21 is a schematic diagram showing an example in which a map and buildings are displayed as a bird's-eye view.

The route search server 30 is provided with road network data (database/DB) 316 for route searching, map data (database/DB) 317, a route search means 315, a control means (CPU) 311, a communication means 312, a route guiding means 313, and a transmission data creation means 314. As shown in FIG. 20, the road network data accumulated in the route search road network DB 316 are composed of node data, link data, and cost fink cost) data for each link. As previously mentioned, the map data 317 are composed of unit data (mesh data) that are divided into a prescribed size by latitude and longitude, and include the building data described using FIG. 2.

The control means 311 is centered on a microprocessor and provided with RAM, ROM, and other storage means in the same manner as a common computer device, and controls each component using a program accumulated in the storage means. The communication means 312 receives a route search request or a map data transmission request from the map display device 20, and transmits requested map data or the guidance route data that are the result of a route search to the map display device 20.

The route guiding means 313 creates guidance route data on the basis of the data of the optimum guidance route searched by the route search means 315, and transmits the guidance route data to the map display device 20. The departure point, turns in the route, intersections, the destination point, and other guidance points on the guidance route searched by the route search means 315 are set in the guidance route data, and the guidance route data include the position coordinates (latitude and longitude) of the guidance points, and guidance information (straight-ahead or left/right turn guidance information) relating to each guidance point. The map display device 20 receives the guidance route data, displays the route, and outputs a display or a sound for guidance at the guidance points.

The transmission data creation means 314 creates data for transmission to the map display device 20 using the guidance route data created by the route guiding means 313 or the map data requested from the map display device 20, and transmits the data to the map display device 20 via the communication means 312.

The map display device 20 is provided with a control means (CPU) 211, a communication means 212, a data storage means 213, VRAM 214, a display means 215, an operation/input means 216, a data request means 217, an means for creating a plane figure for a bird's-eye view 218, a shift amount storage means 219, a building position determination means 220, and a map data duplication means 221.

The control means 211 is not shown in the drawing, but is a microprocessor having RAM, ROM, and a processor, and the control means 211 controls the operation of each component using a control program stored in the ROM. The operation/input means 216 is composed of a number key, alphabet key, or other function key, a selection key, a display unit, and other components, and the route search conditions or the like are inputted by selecting the desired menu from a menu screen displayed by the display unit, or by operating the number key or alphabet key. The communication means 212 is an interface for communicating with the route search server 30 via the network 11.

The departure point, the destination point, the departure time, the arrival time, and other route search conditions are set using the operation/input means 216, and a route search request is created by the data request means 217 and transmitted to the route search server 30. Mesh data (unit maps) are also specified using the operation/input means 216 when map data are requested from the route search server 30. When the map display device 20 is provided with a GPS receiver or other means for determining the current position, a request for current position information or map data that include the current position is created by the data request means 217 on the basis of information about the current position determined by the GPS receiver, and is transmitted to the route search server 30.

The data storage means 213 temporarily stores the guidance route data or the map data transmitted from the route search server 30, and the VRAM 214 presents the guidance route data and map data in bitmap format when the guidance route data or map data stored in the data storage means 213 are displayed in the display means 215. The display means 215 is a display unit composed of a liquid crystal display panel or the like that displays an image based on the bitmap data presented to the VRAM 214.

In Example 1, image data are presented as a bitmap to the VRAM 214 according to the sequence described hereinafter by the means for creating a plane figure for a bird's-eye view 218, the shift amount storage means 219, the building position determination means 220, and the map data duplication means 221 on the basis of the map data that are transmitted from the route search server 30 and temporarily stored by the data storage means 213. As previously mentioned, the means for creating a plane figure for a bird's-eye view 218 performs affine transformation of plane figures of buildings to create the birds-eye-view plane figures shown in FIG. 4. The building position determination means 220 performs affine transformation of the plane figures of the buildings in sequence from the building positioned farthest away in the birds-eye view, and performs processing for determining the position of each building from the building data in order to create plane figures. The shift amount storage means 219 stores a shift amount as a preset value for duplicating and drawing the bird's-eye-view plane figures while shifting the plane figures upward on the screen as shown in FIG. 5 by a prescribed amount according to the height or number of floors recorded in the attribute information of the building data.

The map data duplication means 221 duplicates and overwrites the bird's-eye-view plane figures created by the means for creating a plane figure for a bird's-eye view 218 upward on the screen. The amount of upward shift is determined by the shift amount stored in the shift amount storage means 219, and the number of duplications is determined according to the height (number of floors) of the building. For example, a ten-story building can be indicated by ten duplications. In Example 1, even when each building has a different number of floors, each building is not displayed separately according to each different number of floors; for example, the buildings are classified as tall, medium, or short, and the number of duplications is uniformly set to ten stories for medium-sized buildings.

FIG. 7 is a flowchart showing the sequence of routines for creating the image data for displaying the bird's-eye view according to Example 1 of the present invention described above. In the routine of step S10, the map display device 20 receives the map data from the route search server 30, and the received map data are temporarily stored in the data storage means 213 in the routine of step S11. When a bird's-eye view is displayed in the display means 215, the building position determination means 220 sequentially determines the building positioned farthest from the vantage point of the bird's-eye view, i.e., the building positioned farthest away in the bird's-eye view on the basis of the building data (see FIG. 2) in the routine of step S12.

In the routine of the subsequent step S13, the means for creating a plane figure for a bird's-eye view 218 performs affine transformation of the vector data that indicate the planar shape of the buildings in sequence from the building determined by the building position determination means 220, and creates bird's-eye-view plane figures (plane polygons). The bird's-eye-view plane figures created for each building are as shown in FIG. 4. Once the birds-eye-view plane figures are created in the routine of step S13, roads or building lots are drawn by the VRAM 214 in the routine of step S14. The birds-eye-view plane figures created in the routine of step S13 are then drawn over each other by the VRAM 214 in the routine of step S15.

In the routine of step S16, the bird's-eye-view plane figures are then duplicated while being shifted upward on the screen by the shift amount that was stored in advance in the shift amount storage means 219 on the basis of the attribute information relating to the height or number of floors of the buildings, and the bird's-eye-view plane figures are drawn in the VRAM 214. In order to simplify the description, all of the buildings in this case are displayed as short structures that correspond to five-story buildings. Accordingly, three-dimensional representations of buildings such as the ones shown in FIG. 5 can be created by five repetitions of the routine for duplicating drawings of the bird's-eye-view plane figures in the VRAM 214 while shifting the birds-eye-view plane figures upward on the screen by the shift amount.

Accordingly, in the routine of step S17, a determination is made as to whether the number of duplications and drawings for the prescribed number of floors (five in the case described above) is completed, and when the prescribed number of times has not been reached, the process returns to step S16, and the routine for duplicating drawings of the bird's-eye-view plane figures in the VRAM 214 while shifting the bird's-eye-view plane figures upward on the screen by the shift amount is repeated until the prescribed number of times is reached. When the abovementioned routine is completed the prescribed number of times, the image data drawn in the VRAM 214 are displayed in the display means 215. The building image displayed in this manner is as shown in FIG. 5. In FIG. 5, the roads and the building lot shapes are omitted to simplify the diagram.

A determination is made in the routine of step S19 as to whether the map display device 20 has moved. When there is no movement, the drawing routine is completed; when there is movement, the process returns to step S12, and the sequence of routines from the determination of the building position to the display routine of step S18 is repeated. The results of measurement of the current position by the aforementioned GPS receiver or the like can be used to determine whether the map display device 20 has moved. When the map display device 20 has moved a long distance, and the map data transmitted from the route search server 30 are inadequate, the result of the current position measurement and the stored map data are consulted to request transmission of the needed map data from the route search server 30.

When the map display device 20 requests a route search from the route search server 30, the guidance route data transmitted from the route search server 30 may be drawn in the VRAM 214 in the drawing routine of step S15.

Example 2

The display method in Example 1 performed a drawing routine for displaying the buildings at a uniform height, but a display method may also be employed that draws the buildings accurately according to the height or number of floors. Example 2 is a flowchart showing the sequence of routines in this display method. The map display system 10 is configured in the same manner as in Example 1.

Figure 8:
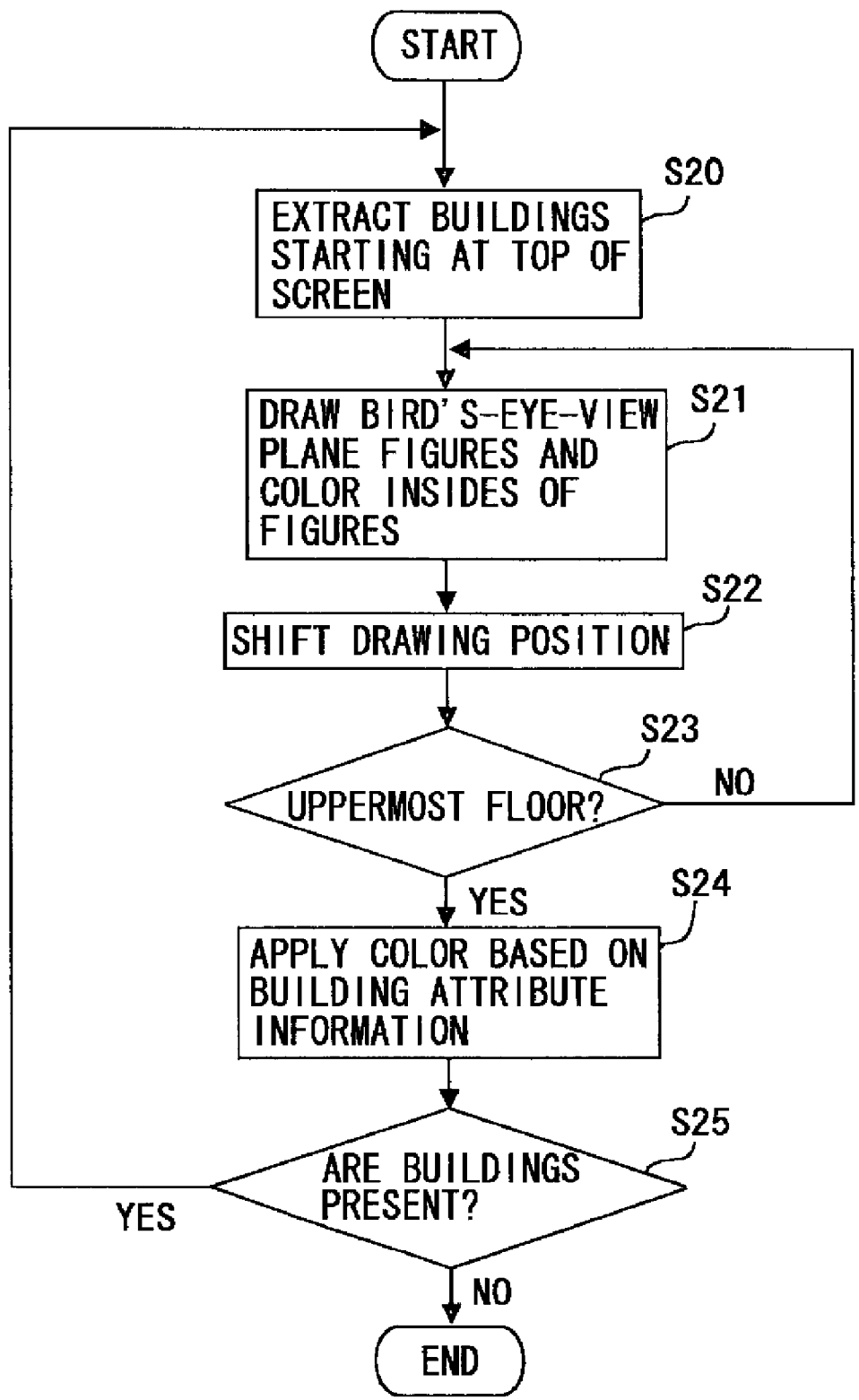
FIG. 8 is a flowchart showing the sequence of display routines according to Example 2 of the present invention.

Example 2 is a method for reproducing a building relatively faithfully when the number of floors is included in the building data. FIG. 8 is a flowchart showing the sequence of display routines according to Example 2 of the present invention. In the routine of step S20, the building position determination means 220 extracts buildings at the top of the screen, i.e., buildings that are at distant positions in the bird's-eye view. Then, in the routine of step S21, the means for creating a plane figure for a bird's-eye view 218 affine transforms vector data that indicate the shapes of the buildings extracted in step S20 and creates bird's-eye-view plane figures (plane polygons), and draws the bird's-eye-view plane figures in the VRAM 214. This procedure first draws outlines (boundary lines) of the polygons and colors the insides in a certain color. The polygons are uniformly colored gray, for example.

In the routine of the subsequent step S22, a pointer for drawing the plane polygons of the buildings is moved one floor upward, and the bird's-eye-view plane figure (plane polygon) is duplicated and drawn in the VRAM 214. The routine of step S23 confirms whether the number of floors in the building being drawn have been drawn, i.e., whether the uppermost floor has been drawn. For example, when the building has only one floor, the confirmation result is immediately YES, and the process proceeds to the routine of the subsequent step S24, and the plane polygon is drawn in the drawing color determined by the attribute information of the building. In other words, since even a building having only one floor is drawn by two plane polygons, the display creates a sense of depth in the height direction. Since the portion corresponding to the roof of the building is displayed in the building attribute color, a function is provided for identifying the buildings in the conventional aerial-view-only display.

In the routine of step S23, a determination is made as to whether the uppermost (*1) floor of the building has been drawn, and when the uppermost floor has not yet been drawn, the process returns to the routine of step S21, and drawing is performed a number of times equal to the number of floors to increase the number of drawn floors. This processing specifically does not require additional affine transformation or computation by the Z buffer method, and is performed merely by continuing to copy the plane polygons. This processing is therefore extremely rapid. When the building has been drawn to the uppermost floor according to the determination routine of step S23, the same processing described for step S24 is performed. The presence of buildings is sequentially determined in step S25, and when buildings still remain, the process returns to step S20 and repeats the sequence of routines to step S25 until the last building in the range of the screen, whereupon the process is completed.

Figure 9:
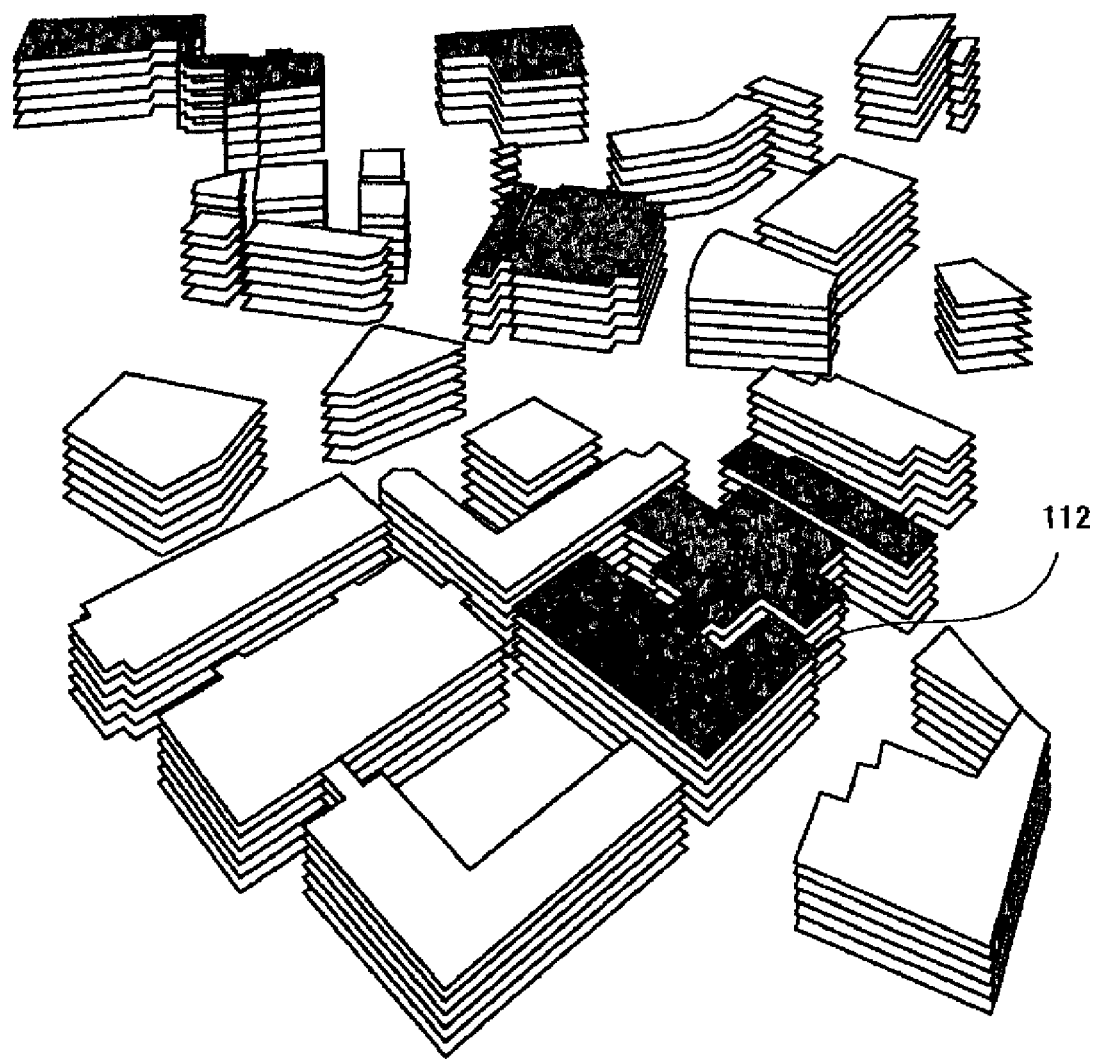
FIG. 9 is a schematic diagram showing an example of the map image drawn by the procedure shown in FIG. 8.

The three-dimensional representation of the buildings drawn in this manner is as shown in FIG. 9. FIG. 9 shows a display in which all of the buildings have five stories, but since the farthest buildings are drawn first, the buildings in front are drawn subsequently, and the buildings can be correctly displayed without any particular overlap determination. When the information included in the building data is for the height of the buildings instead of the number of floors, a single floor can be assumed to be 3 m high, for example, to estimate the number of floors.

Example 3

For a pedestrian, it may not be necessary to faithfully represent the height of the buildings. The number of floors is unimportant particularly for tall buildings, and only the fact that the building is tall is important, so the map display device is adequate insofar as the building can be depicted as tall. Therefore, the building heights in Example 3 of the present invention are classified into the two height types tall and short, and there are two numbers of times which the bird's-eye-view plane figures (polygons) are duplicated and drawn. The map display system 10 of Example 3 is configured in the same manner as the map display system 10 in Example 1.

Figure 10:
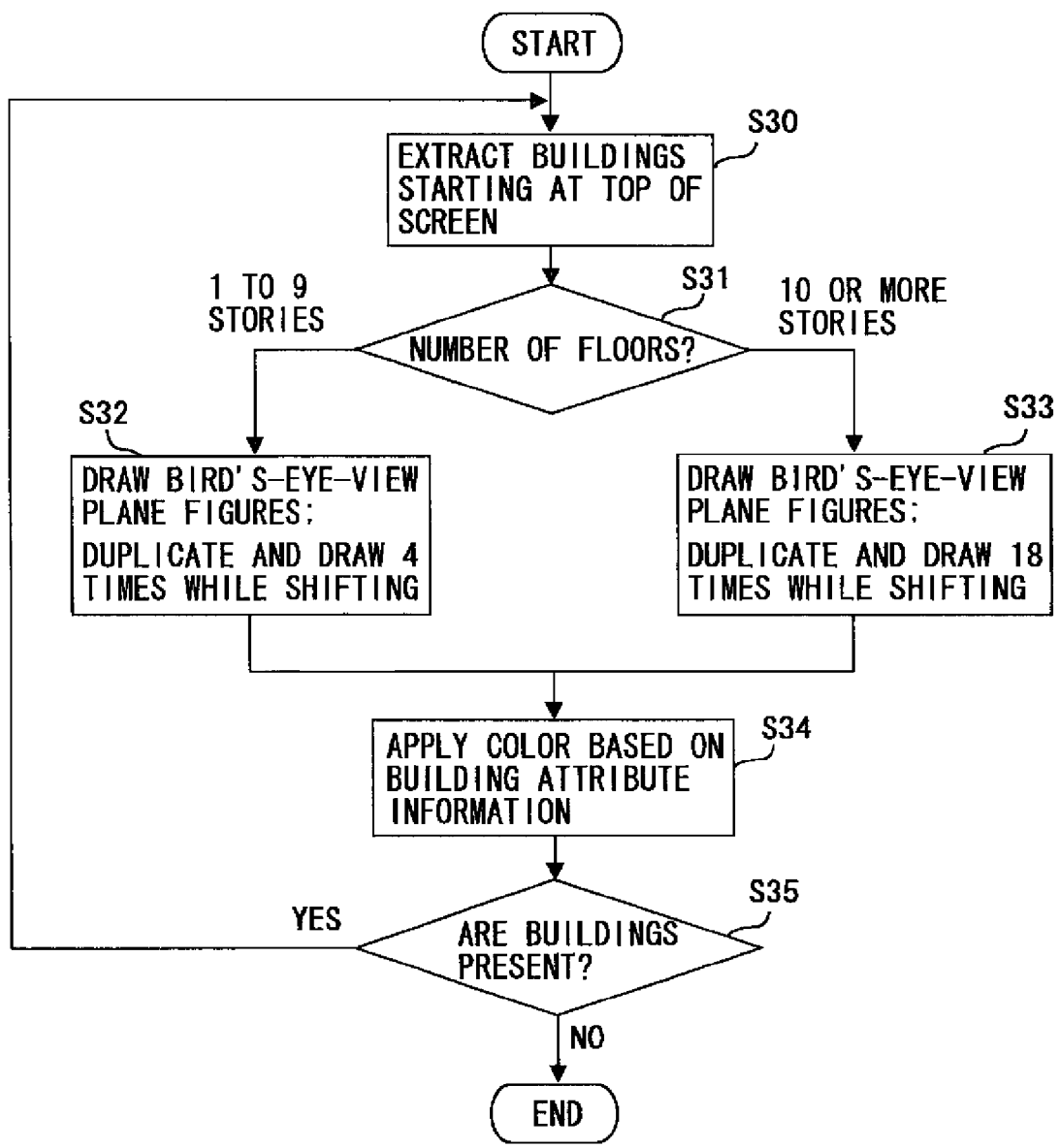
FIG. 10 is a flowchart showing the sequence of display routines according to Example 3 of the present invention.

FIG. 10 is a flowchart showing the sequence of display routines according to Example 3 of the present invention. In the routine of step S30, the building position determination means 220 extracts buildings at the top of the screen, i.e., buildings that are at distant positions in the bird's-eye view. Then, in the routine of step S31, the building position determination means 220 references the building floor number data in the extracted building attribute information to determine the number of floors of a building. When the number of floors in the building is 1 through 9, the process proceeds to step S32, and the means for creating a plane figure for a bird's-eye view 218 affine transforms vector data that indicate the shapes of the buildings extracted in step S30 and creates bird's-eye-view plane figures (plane polygons), and draws the bird's-eye-view plane figures in the VRAM 214. The building plane figures are duplicated while being shifted upward, and the routine for drawing in the VRAM 214 is repeated four times.

When a building has 10 or more floors in the routine of step S31, the process proceeds to step S33, and means for creating a plane figure for a bird's-eye view 218 affine transforms vector data that indicate the shapes of the buildings extracted in step S30 and creates bird's-eye-view plane figures (plane polygons), and draws the bird's-eye-view plane figures in the VRAM 214. The building plane figures are duplicated while being shifted upward, and the routine for drawing in the VRAM 214 is repeated eighteen times. Since the drawing performed in steps S32 and S33 is processing for which copying in the same manner as Example 2 is adequate, the arithmetic processing can be performed at high speed. The number of drawings (number of duplications) is not limited by this example, and may be appropriately determined.

When the drawing performed in steps S32 and S33 is completed, the plane figure of the uppermost floor is drawn in a color based on the attributes in the routine of step S34 in any case, and the presence of buildings is sequentially determined in the routine of step S35. When buildings still remain, the process returns to step S30 and repeats the sequence of routines to step S35 until the last building in the range of the screen, whereupon the process is completed.

Figure 11:
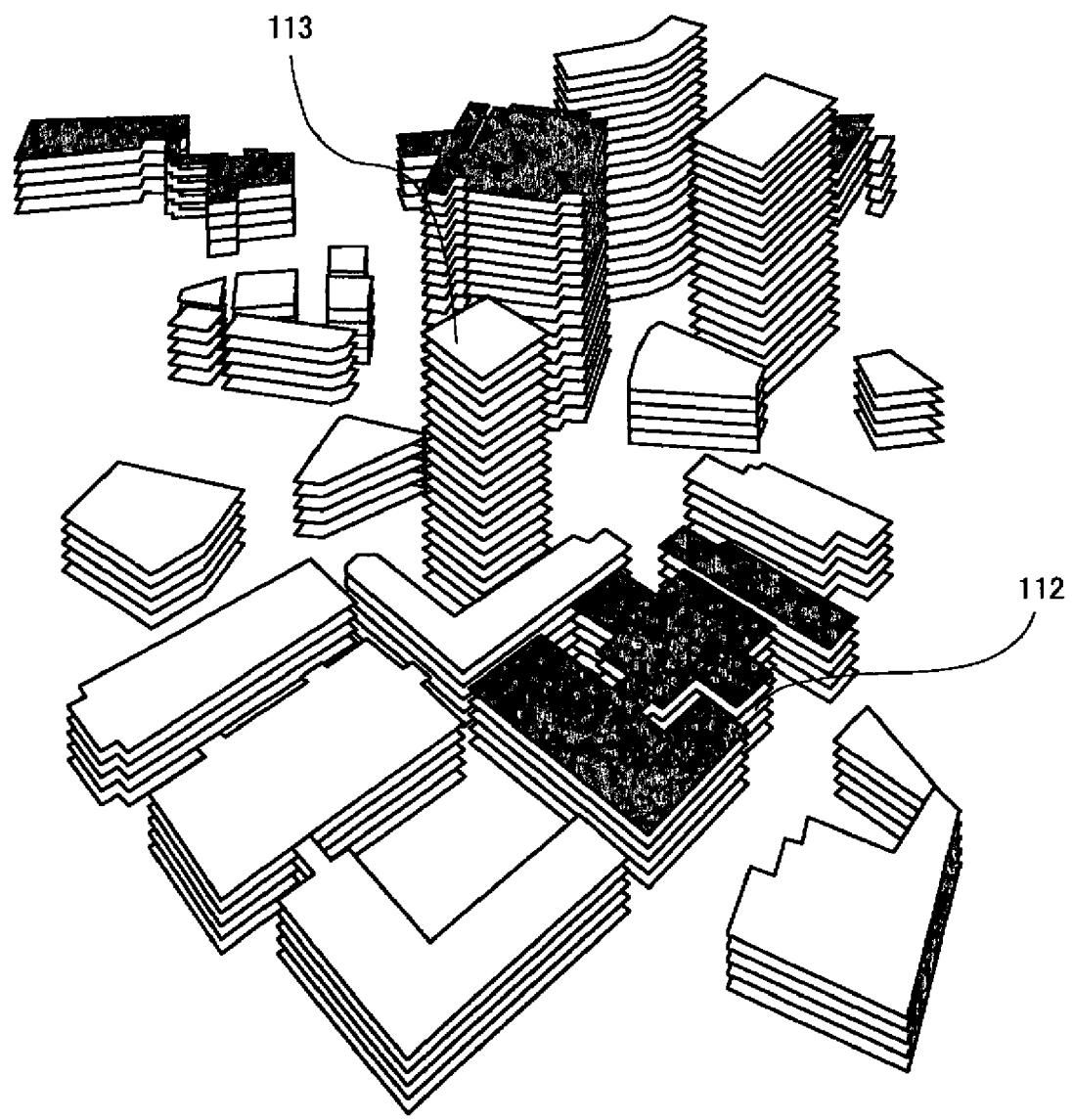
FIG. 11 is a schematic diagram showing an example of the map image drawn by the procedure shown in FIG. 10.

The three-dimensional representation of the buildings drawn in this manner is as shown in FIG. 11. FIG. 11 shows a display in which the short building 112 having less than ten stories is shown with a small number of floors, tall buildings having ten or more stories are shown with a large number of floors, and tall buildings can be intuitively recognized. In this case as well, since the farthest buildings are drawn first, the buildings in front are drawn subsequently, and the buildings can be correctly displayed without any particular overlap determination. When the information included in the building data is for the height of the buildings instead of the number of floors, a single floor can be assumed to be 3 m high, for example, to estimate the number of floors.

Figure 12:
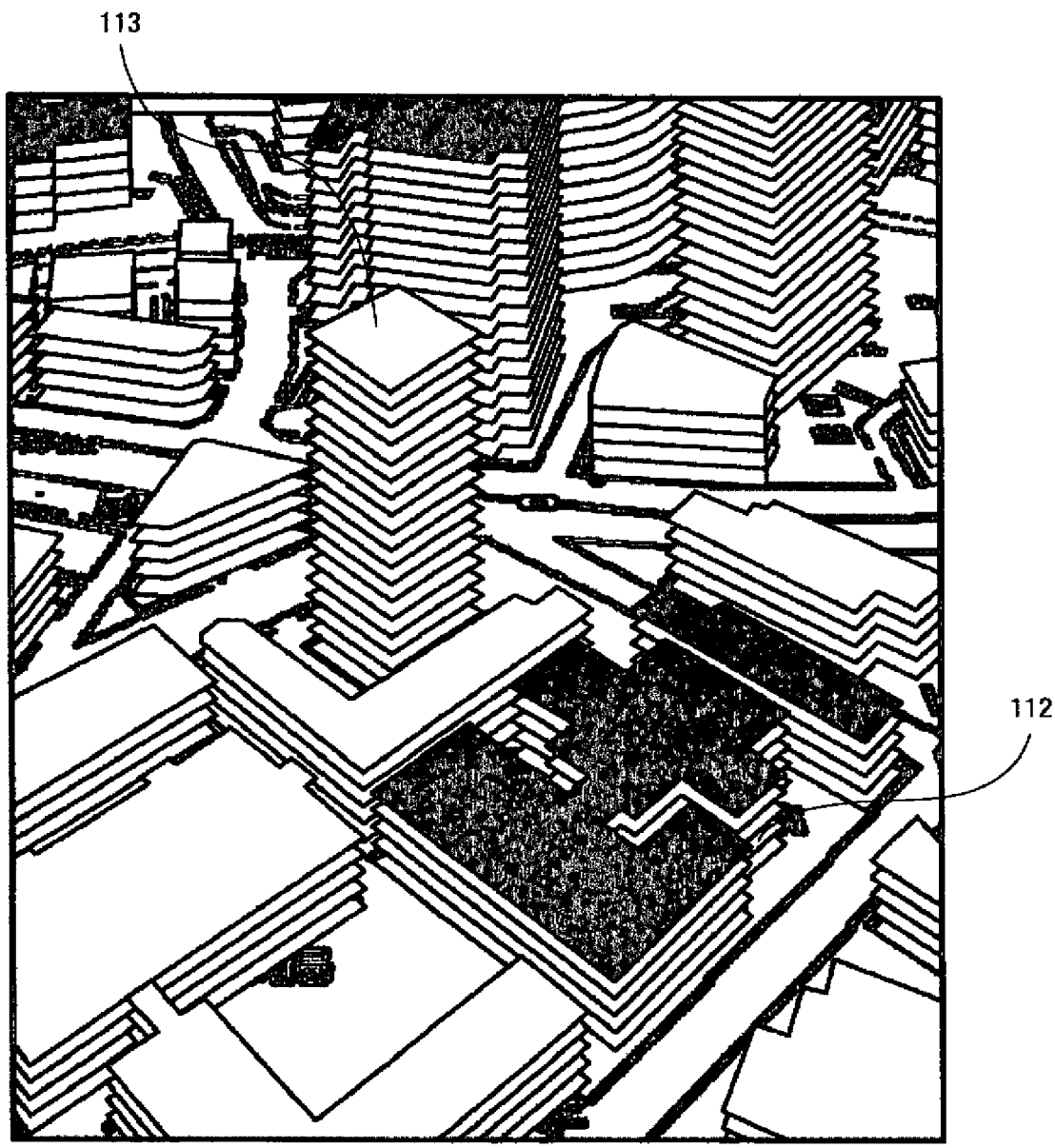
FIG. 12 is a schematic diagram showing a state in which the image in FIG. 11 is synthesized and drawn on the birds-eye view.
Figure 13:
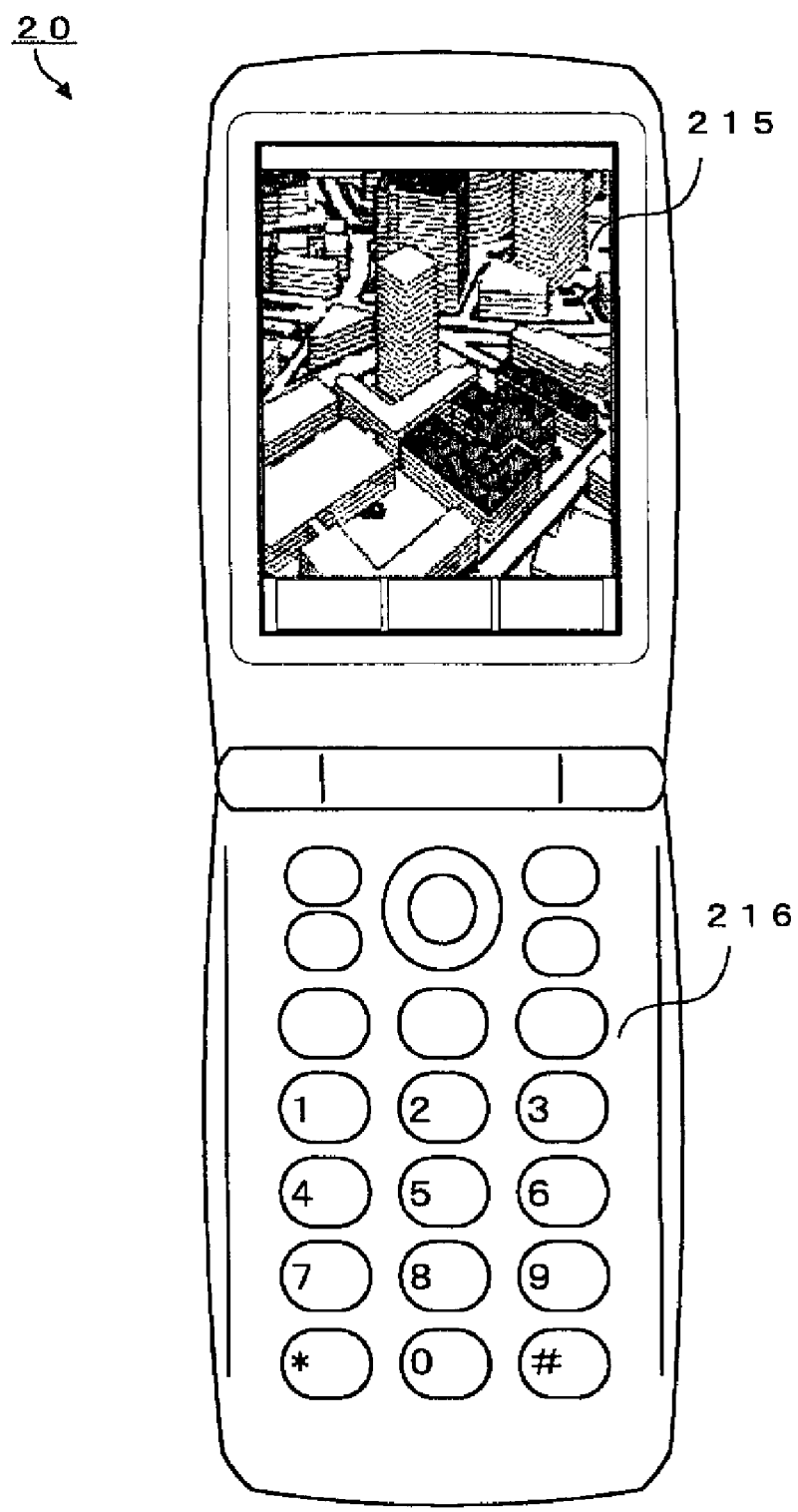
FIG. 13 is an external view showing a state in which the image in FIG. 11 is displayed in the display means of a mobile telephone as the map display device.

FIG. 12 shows a state in which the image in FIG. 11 created in the manner described above is synthesized over the bird's-eye view. FIG. 13 is an external view showing a state in which the image in FIG. 11 is displayed in the display means 215 of a mobile telephone as the map display device 20. The reference numeral 216 in FIG. 13 indicates a operation/input means. When the image is displayed at the size of the display screen of a mobile telephone, the buildings can be displayed with an adequate sense of depth even without displaying building columns or walls. The building heights are not strictly correct, but the effects of classifying the buildings are adequate.

Figure 14:
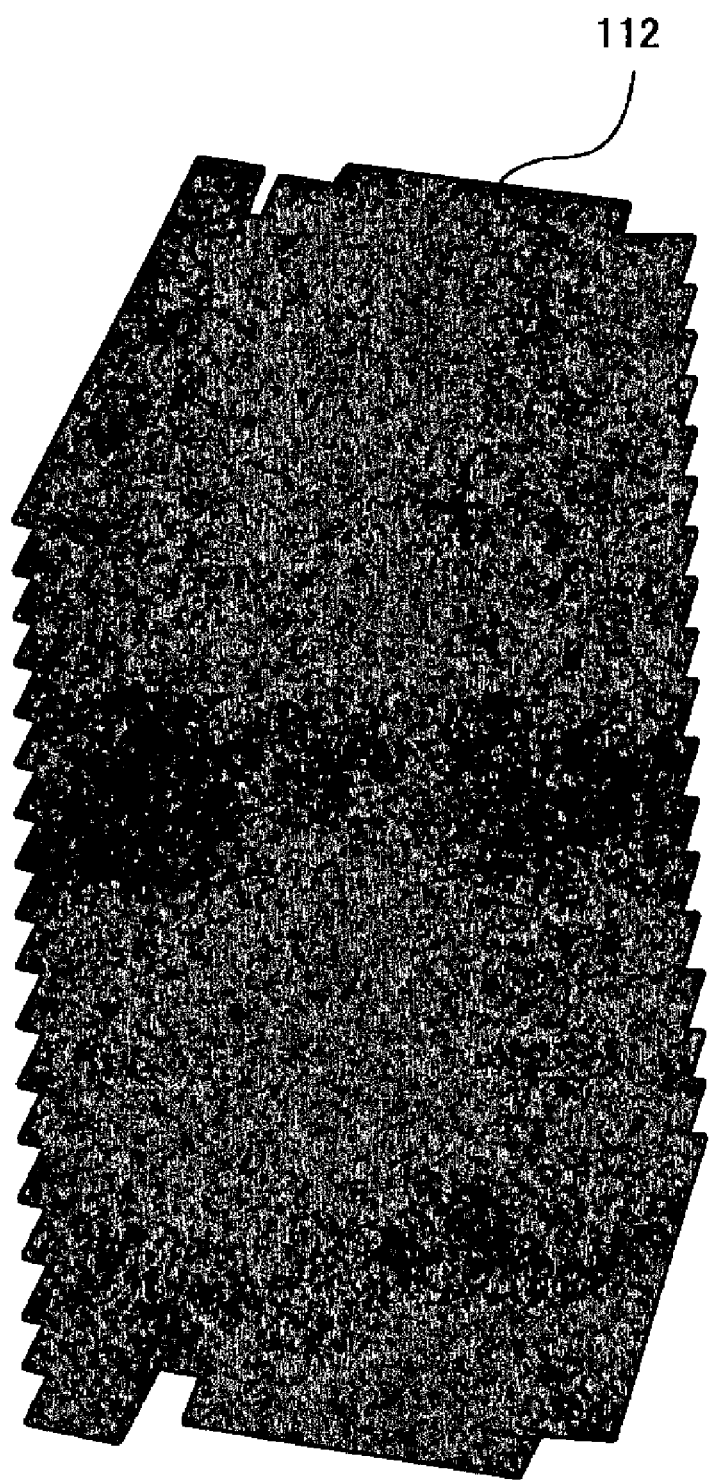
FIG. 14 is a schematic diagram showing a case in which all the floors in an image are colored based on attribute information (color) of the building.
Figure 15:
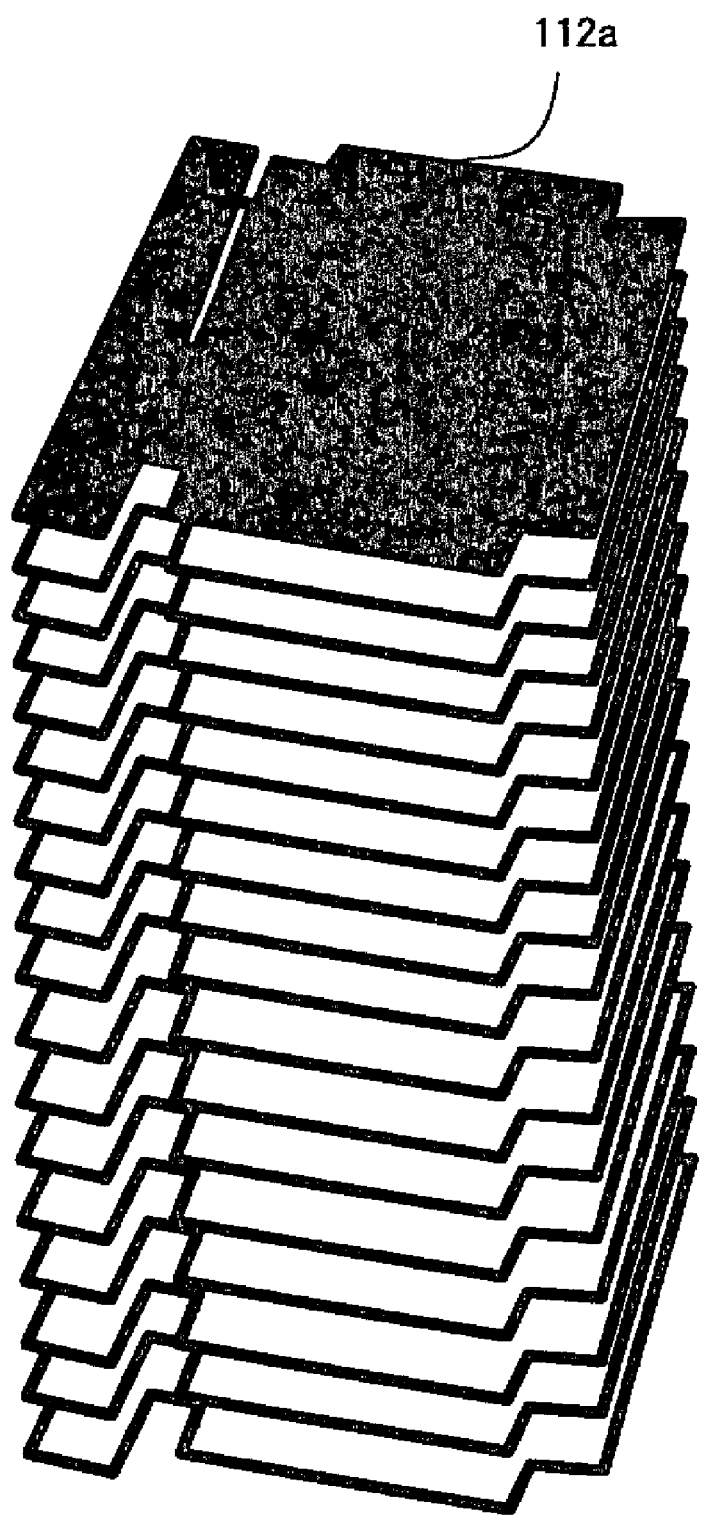
FIG. 15 is a schematic diagram showing a case in which a color is applied only to the image of the uppermost floor on the basis of the attribute information (color) of the building.
Figure 16:
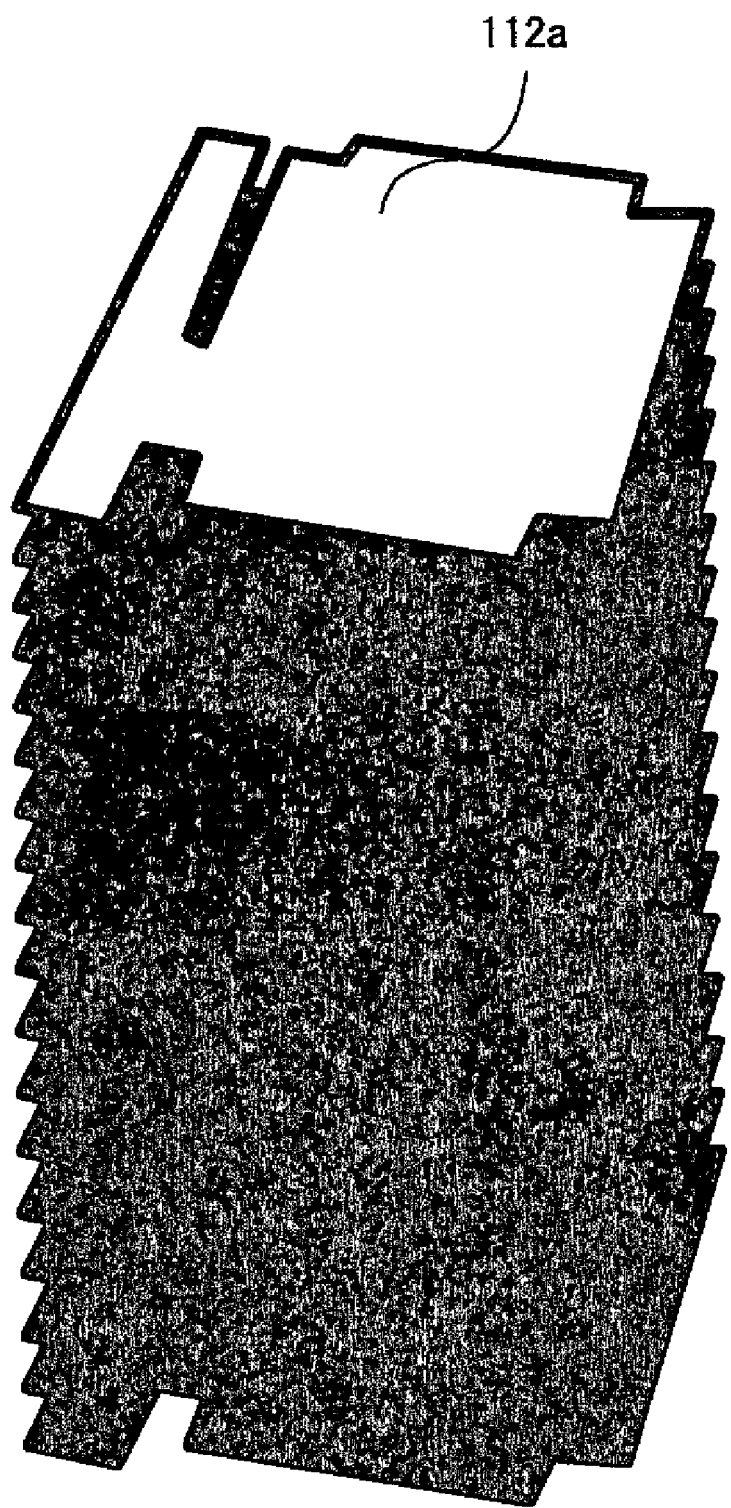
FIG. 16 is a schematic diagram showing a case in which the image of the uppermost floor and the image of the other floors have a different color on the basis of the attribute information (color) of the building.

When a bird's-eye view is displayed according to Examples 1 through 3 described above, a building display such as the one shown in FIG. 14 that is difficult to understand is created when all of the floors are colored in the same color based on the attributes of the building 112. Therefore, drawing the uppermost floor 112a in a different color as shown in FIG. 15 or FIG. 16 creates a more easily recognizable display.

Example 4

Figure 17:
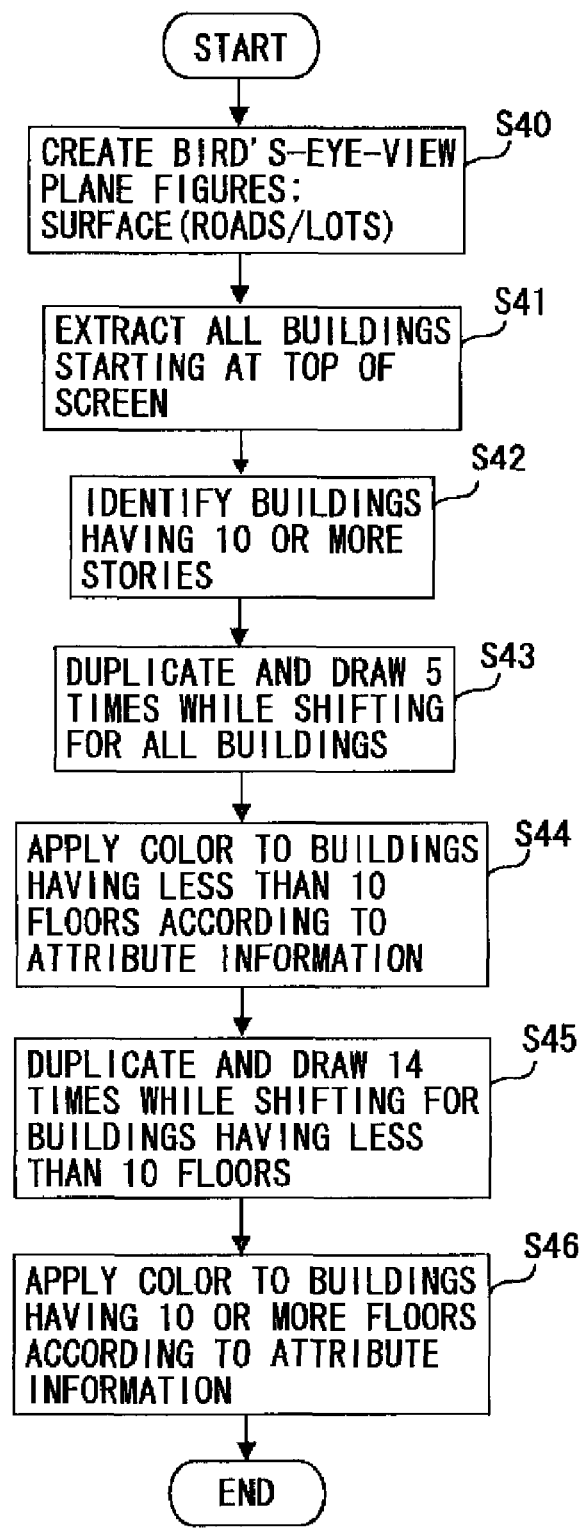
FIG. 17 is a flowchart showing the sequence of display routines according to Example 4 of the present invention.

The drawing control performed by the sequence of routines described in Examples 1 through 3 above can be performed by more efficient arithmetic processing. FIG. 17 is a flowchart showing the sequence of display routines according to Example 4 of the present invention. In the procedure of Example 4, the building heights are classified as high or low, and only the high buildings are drawn after drawing of all the low buildings is completed. The map display system in Example 4 is configured in the same manner as in Example 1.

In FIG. 17, the means for creating a plane figure for a bird's-eye view 218 first extracts the buildings in sequence from the farthest buildings on the screen in the routine of step S40 according to the same method used in the other examples, and affine transforms the vector data indicating the shapes of the buildings to create bird's-eye-view plane figures (polygons). The roads, lots, and other features of the map are then drawn, and the birds-eye-view plane figures of all the buildings are drawn in the VRAM 214. Drawing of the surface features is completed by this routine.

In the routine of the subsequent step S41, the building position determination means 220 extracts all of the buildings in sequence from the farthest (top) buildings on the screen, and buildings having ten or more stories are identified in the routine of step S42. The bird's-eye-view plane figures (polygons) of all the buildings are then duplicated five times while being shifted upward on the screen by a shift amount that is set in advance in the shift amount storage means, and the bird's-eye-view plane figures are drawn in the VRAM 214. In this case, the buildings are classified into buildings having less than ten stories and buildings having ten or more stories, the buildings having less than ten stories are uniformly drawn as five-story buildings, and buildings having ten or more stories are drawn as nineteen-story buildings in the subsequent processing step S45.

When the routine of step S43 is completed, the buildings having less than ten stories are colored in the routine of step S44 according to the color set in the building attribute information. Then, in the routine of step S45, the bird's-eye-view plane figures (polygons) of the buildings having ten or more stories are duplicated fourteen times while being shifted upward on the screen by a shift amount that is set in advance in the shift amount storage means, and the birds-eye-view plane figures are drawn in the VRAM 214. For the buildings that have ten or more stories, the fourteen layers of figures are drawn over the five layers that were drawn in the routine of step S43, and the buildings are therefore drawn as nineteen-story buildings. In the routing of step S46, the buildings having ten or more stories are colored according to the color set in the attribute information of each building, and the routine is completed.

Figure 18:
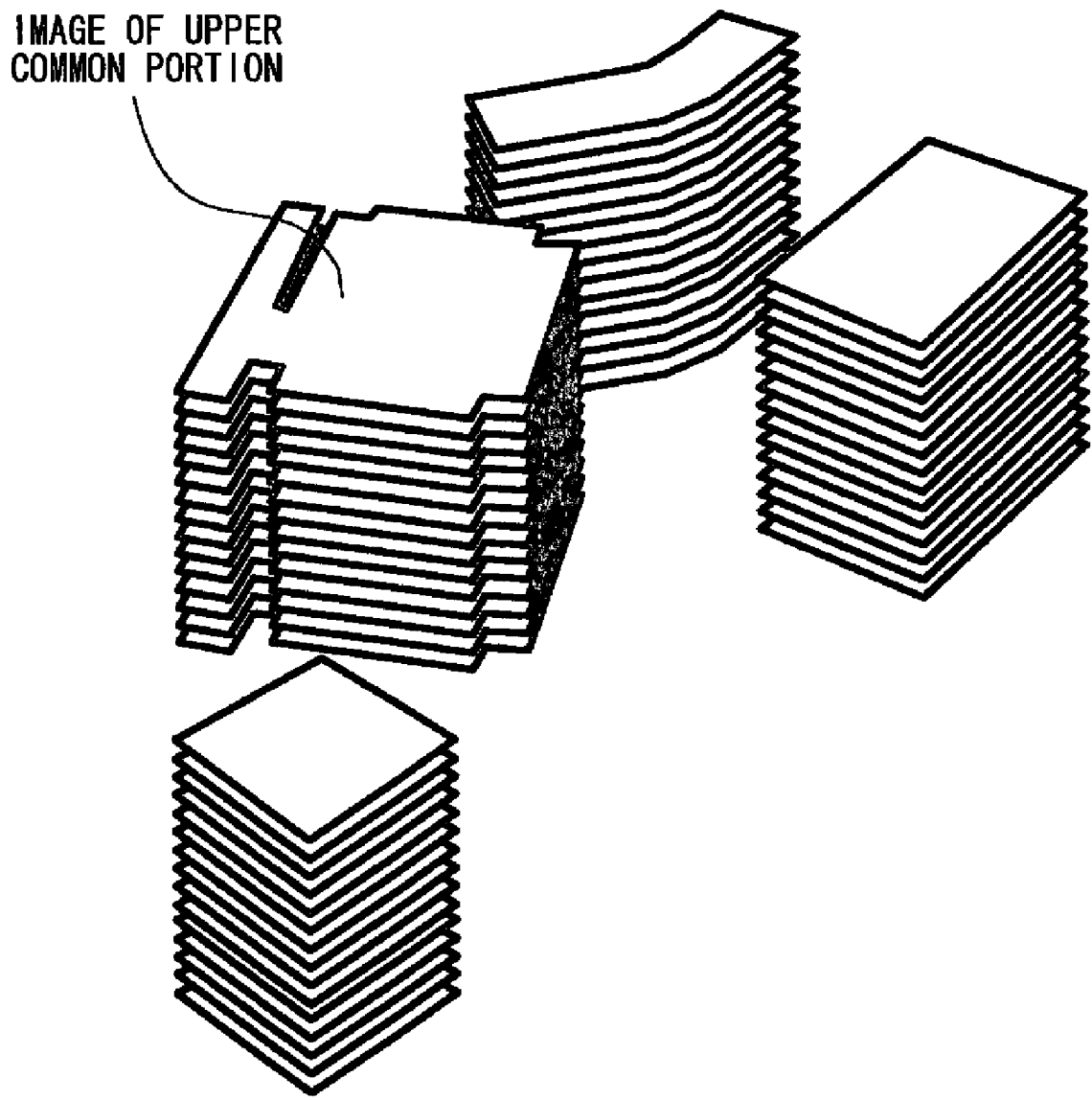
FIG. 18 shows an image of an upper-level common portion that is drawn over a lower-level common portion in the processing sequence shown in FIG. 17.

The building heights are thus classified into two levels, the polygons of the lower levels common to the buildings are grouped, the common levels are copied, and the upper common portions are then repeatedly processed in the same manner, whereby the floors of a plurality of buildings are drawn at once. Processing can therefore be performed at high speed with extremely high efficiency. FIG. 18 shows an image of the upper-level common portions that are drawn above the lower-level common portions in processing step S45 described above. This processing procedure can also be adapted to represent other height levels by dividing the levels into a plurality of building height levels, e.g., three classifications of short, medium, and tall, rather than the two building height levels used in Example 4. Since the floors of a plurality of buildings are drawn at once, processing can be performed at high speed with extremely high efficiency.

Figure 19:
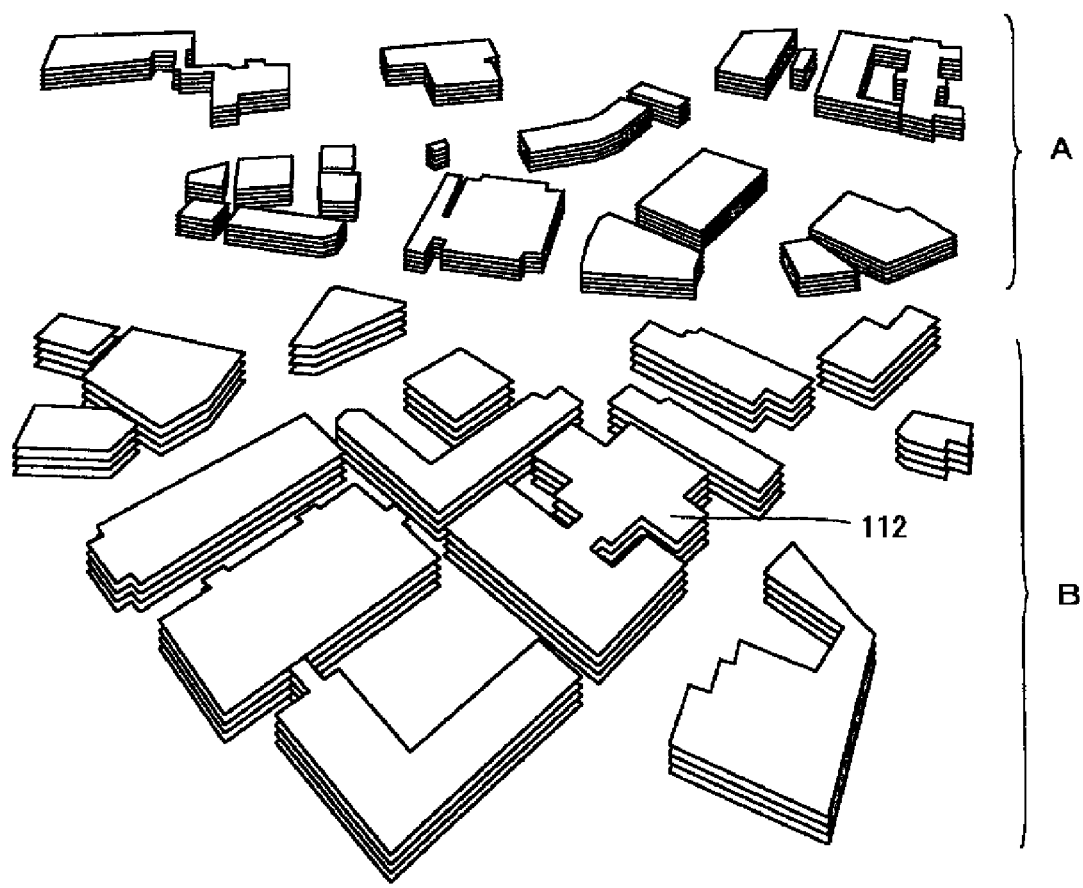
FIG. 19 is a schematic diagram showing a case in which distant buildings are drawn so as to appear more natural.

When the plane polygons of buildings in the bird's-eye view are shifted a prescribed amount at a time, the drawing of buildings 112 at the top of the screen (distant buildings) sometimes appears unnatural. Since buildings that are farther away appear smaller, and polygons flatten at angles that approach the horizon the farther away the polygons are, the floors can appear separated when shifted by the same amount. Therefore, a convenient method, for example, is to draw using a different amount of shift in the upper one-third A of the display region of the screen than in the remaining two-thirds B of the display region. When drawing is performed in this manner, since the amount of shift of the floors of distant buildings (in display region A) is smaller than the amount of shift of the floors of near buildings (display region B) as shown in FIG. 19, the polygons flatten at angles near the horizon the further the buildings are in region A, and a more natural display is created.

Structures in which the planar shape of the building changes from the lower portion to the upper portion, e.g., Tokyo Tower and the like, cannot be represented by the drawing method of the present invention in which bird's-eye-view plane figures are duplicated. A configuration may be adopted for such buildings whereby simple image data for such buildings are prepared separately in advance and superimposed during drawing in the VRAM.

INDUSTRIAL APPLICABILITY

The display method described above is suitable for application in a device such as a mobile telephone in which the CPU has limited processing capability. However this application is not limiting, and because a large number of buildings is displayed by an application such as a map display application having a large screen and a wide field of view in a map display by a personal computer or the like, this technique can be applied to provide a high-speed display.

The invention claimed is:

1. A map display device for displaying map data that are composed of vector data in a display means, said map display device comprising:
   means for creating a plane figure for a bird's-eye view, shift amount storage means, building position determination means, and figure data duplication means;
   the means for creating a plane figure for a bird's-eye view creates bird's-eye-view plane figures of buildings in sequence from the building positioned farthest away in a bird's-eye view on the basis of a building position determined by the building position determination means, and draws a first layer of plane data; and
   said figure data duplication means duplicates and draws said first layer of plane data while shifting the first layer of plane data upward on a screen according to said shift amount on the basis of the shift amount stored by said shift amount storage means, and displays said bird's-eye view,
   characterized in that said map data composed of vector data include building data to which height information relating to a height of a building is added,
   a bird's-eye-view plane figure is duplicated and drawn a number of times that is in accordance with said height information while being shifted upward on said screen by said shift amount,
   said buildings are divided into a plurality of groups having different heights on the basis of the height information,
   a number of times in accordance with said height information is determined for each group,
   bird's-eye-view plane figures of buildings that have portions at a common height among buildings in a bird's-eye view are grouped, and
   said grouped bird's-eye view plane figures are duplicated and drawn while said grouped bird's-eye-view plane figures are shifted in sequence from said first layer said determined number of times upward on said screen according to a shift amount.

2. A map display method in a map display device for displaying map data that are composed of vector data in a display means, wherein said map display device comprises means for creating a plane figure for a bird's-eye view, shift amount storage means, building position determination means, and figure data duplication means, said map display method comprising:
   a step in which the means for creating a plane figure for a bird's-eye view creates bird's-eye-view plane figures of buildings in sequence from the building positioned farthest away in a bird's-eye view on the basis of a building position determined by the building position determination means, and draws a first layer of plane data; and
   a step in which said figure data duplication means duplicates and draws said first layer of plane data while shifting the first layer of plane data upward on a screen according to said shift amount on the basis of the shift amount stored by said shift amount storage means; and
   a step in which said bird's-eye view is displayed,
   characterized in comprising a step in which
   said map data composed of vector data include building data to which height information relating to a height of a building is added; and
   a bird's-eye-view plane figure is duplicated and drawn a number of times that is in accordance with said height information while being shifted upward on said screen by said shift amount, and
   characterized in comprising a step in which
   said buildings are divided into a plurality of groups having different heights on the basis of the height information;
   a number of times in accordance with said height information is determined for each group;
   bird's-eye-view plane figures of buildings that have portions at a common height among buildings in a bird's-eye view are grouped; and
   said grouped bird's eye view plane figures are duplicated and drawn while said grouped bird's-eye-view plane figures are shifted in sequence from said first layer said determined number of times upward on said screen according to a shift amount.

* * * * *